US011057349B2

(12) United States Patent
Nellen

(10) Patent No.: US 11,057,349 B2
(45) Date of Patent: Jul. 6, 2021

(54) CLOUD-BASED MULTI-FUNCTION FIREWALL AND ZERO TRUST PRIVATE VIRTUAL NETWORK

(71) Applicant: TODYL, INC., New York, NY (US)

(72) Inventor: John Nellen, Demarest, NJ (US)

(73) Assignee: Todyl, Inc., New York, NY (US)

( * ) Notice: Subject to any disclaimer, the term of this patent is extended or adjusted under 35 U.S.C. 154(b) by 200 days.

(21) Appl. No.: 16/179,403

(22) Filed: Nov. 2, 2018

(65) Prior Publication Data
US 2019/0141015 A1 May 9, 2019

Related U.S. Application Data

(60) Provisional application No. 62/581,318, filed on Nov. 3, 2017.

(51) Int. Cl.
| | | |
|---|---|---|
| *H04L 29/06* | (2006.01) | |
| *H04L 29/08* | (2006.01) | |
| *H04L 29/12* | (2006.01) | |

(52) U.S. Cl.
CPC ...... *H04L 63/0272* (2013.01); *H04L 61/1511* (2013.01); *H04L 63/0218* (2013.01); *H04L 63/1416* (2013.01); *H04L 63/20* (2013.01); *H04L 67/1008* (2013.01); *H04L 67/1021* (2013.01); *H04L 67/30* (2013.01)

(58) Field of Classification Search
CPC . H04L 63/0272; H04L 63/20; H04L 63/1416; H04L 61/1511
See application file for complete search history.

(56) References Cited

U.S. PATENT DOCUMENTS 8,806,606 B2   8/2014 Ahmad et al.
8,892,766 B1  11/2014 Wei
(Continued)

FOREIGN PATENT DOCUMENTS

WO    2013094847 A1    6/2013

OTHER PUBLICATIONS

International Search Report for PCT/US2018/059063, dated Jan. 4, 2019.
(Continued)

*Primary Examiner* — Taghi T Arani
*Assistant Examiner* — Lin Chang
(74) *Attorney, Agent, or Firm* — King & Spalding

(57) ABSTRACT

Method and system embodiments for providing a cloud-based multi-function firewall are described. A method includes retrieving device information associated with a network-enabled device. The device information is transmitted to a secure cloud for configuring a virtual private network (VPN) connection between the secure cloud and the network-enabled device. Cloud information specifying a cloud server in the secure cloud is received from the secure cloud. The secure cloud generates the cloud information based on the device information. Domain name service and routing functions are updated to forward network requests to the cloud server specified in the cloud information. The VPN connection to the secure cloud is established based on the cloud information such that network traffic to and from the network-enabled device is routed through the VPN connection to the cloud-based multi-function firewall implemented on the cloud server.

39 Claims, 14 Drawing Sheets

(56) References Cited

U.S. PATENT DOCUMENTS

| | | | |
|---|---|---|---|
| 9,185,562 | B2 | 11/2015 | Reddy et al. |
| 9,521,217 | B2 | 12/2016 | Brand |
| 9,542,556 | B2 | 1/2017 | Sanders et al. |
| 10,362,046 | B1* | 7/2019 | Srinivasan .......... H04L 63/1433 |
| 2007/0039053 | A1 | 2/2007 | Dvir |
| 2011/0231899 | A1* | 9/2011 | Pulier ................. H04L 63/0272 726/1 |
| 2013/0227670 | A1* | 8/2013 | Ahmad .............. H04L 41/5054 726/11 |
| 2014/0040978 | A1* | 2/2014 | Barton ................. H04W 12/37 726/1 |
| 2015/0043350 | A1* | 2/2015 | Basilier .................. H04L 47/24 370/235 |
| 2015/0200928 | A1* | 7/2015 | Burch ..................... G06F 21/53 726/9 |
| 2016/0057211 | A1 | 2/2016 | Thapliyal et al. |
| 2016/0197886 | A1 | 7/2016 | Lapidous et al. |
| 2016/0248812 | A1 | 8/2016 | Desai et al. |
| 2016/0261564 | A1* | 9/2016 | Foxhoven ........... H04L 67/1021 |
| 2017/0006059 | A1* | 1/2017 | Meulenhoff ........ H04L 63/1458 |
| 2017/0063927 | A1 | 3/2017 | Schultz et al. |
| 2017/0099079 | A1* | 4/2017 | Gross ...................... H04B 3/52 |
| 2017/0111269 | A1 | 4/2017 | Baumgartner et al. |
| 2017/0264686 | A1 | 9/2017 | Sella |
| 2018/0337891 | A1* | 11/2018 | Subbarayan ............ H04L 67/12 |

OTHER PUBLICATIONS

International Preliminary Report on Patentability for PCT/US2018/059063, dated May 5, 2020.

Debashis Basak et al: "Virtualizing networking and security in the cloud", Operating Systems Review, ACM, New York, NY, US, vol. 44, No. 4, Dec. 13, 2010 (Dec. 13, 2010), pp. 86-94.

* cited by examiner

CLOUD-BASED MULTI-FUNCTION FIREWALL AND ZERO TRUST PRIVATE VIRTUAL NETWORK

CROSS-REFERENCE TO RELATED APPLICATIONS

This application claims the benefit of U.S. Provisional Application No. 62/581,318, filed on Nov. 3, 2017, which is herein incorporated by reference and for all purposes.

FIELD OF THE DISCLOSURE

This application relates generally to providing a cloud-based multi-function firewall.

BACKGROUND OF THE DISCLOSURE

A firewall is a network security appliance that can monitor and block incoming and outgoing network traffic between an internal network and an untrusted outside network, e.g., the Internet, to limit access, inspect traffic, and prevent user devices connected to the internal network from certain threats including malware. Malware can include a host of malicious software including, but not limited to, viruses, worms, Trojan horses, drive-by downloads, spyware, adware, ransomware, scareware, rootkits, etc.

Businesses typically implement firewalls in hardware on premise to provide network security to their devices. However, the firewalls can quickly become outdated as hackers in today's world release ever more sophisticated threats to bypass detection. Moreover, updating and scaling the firewalls on premise can be time consuming and complex as software may need to be updated and hardware may need to be reconfigured or replaced. Further, while current firewalls may be effective in restricting access and blocking certain types of threats, a fixed, single point of inspection has limited efficacy. Businesses face a variety of threats including malware, eavesdropping attacks, man-in-the-middle attacks (MITM), exploits, denial-of-service (DoS) attacks, distributed denial-of-service (DDoS) attacks, keyloggers, phishing attacks, and the like. Therefore, businesses often to need to implement multiple disparate security solutions, e.g., anti-malware software, and endpoint threat detection in conjunction with firewall appliances to address the ever growing and evolving software security threats.

Traditionally, firewalls are implemented in a perimeter-based security model to secure a corporation's internal network from external cyber threats. While a firewall on premise may inspect and determine whether to block incoming and outgoing network traffic between an internal network and an untrusted outside network, the firewall does not inspect network traffic between devices connected to the internal network. Therefore, malware such as ransomware or worms that evades the firewall's detection may spread and compromise multiple devices on the internal network.

In today's business and computing environment, a corporation's internal network is no longer a private network located and managed at a single physical location. For example, in today's business environment, the internal network is typically segmented across many physical locations (e.g., across multiple regions or countries) corresponding to multiple offices. In another example, more and more of today's employees are working remotely and operate devices that need to remotely and securely connect to the corporation's internal network. In another example, given the rise of cloud computing services in the past few years, more and more of the corporation's resources and applications have been offloaded to cloud services located remotely and accessed via untrusted networks. Each of these examples illustrates that today's corporate internal network may often include segmented networks (in separate physical locations) that are bridged together or services accessed remotely via untrusted networks.

Therefore, the perimeter-based security model is no longer an effective scheme to protect the company's network and devices due to the increased attack vectors introduced by the connections between the segmented networks within the internal network and connections directly to cloud services. For example, at the office, an unauthorized entity may only gain access to the internal network of the office by gaining access to both user credentials and physical devices on premise. In contrast, a remote user is typically granted access to the internal network based only on user credentials. Therefore, upon obtaining the user credentials, the unauthorized entity may access the internal network on any remote device and network communications associated with the now-compromised user credentials would be able to move laterally across other devices on the local network. Moreover, the network requests from the unauthorized entity would not be inspected by a traditional firewall because the unauthorized entity's remote device is directly connected to the internal network and treated as a trusted entity. In another remote user example, a remote user accessing cloud services does not require access to the internal network and traffic will bypass the corporate firewall entirely. Bypassing the firewall prevents policy enforcement and threat inspection, creating blind spots and increasing risk.

SUMMARY OF THE DISCLOSURE

As discussed above, implementing firewalls is important to limit access and protect user devices. However, current firewall implementations cannot be easily updated and require complex configuration and set up. Moreover, typical firewalls may not be effective or capable of detecting the full range of threats todays users face, including those listed above, and may fail to protect mobile devices when connected to other networks. Further still, current firewalls may not be able to detect threats within network traffic on an internal network. There is a need for systems, methods, and techniques that improve upon current on-premise firewall implementations by providing a cloud-based multi-function firewall system capable of configuring a Zero Trust private virtual network (VN) to protect devices communicating on an internal network.

In some embodiments and in contrast to on-premise firewall implementations, the cloud-based multi-function firewall system has high availability, is highly configurable in the cloud, and provides the functionality to detect and mitigate many types of threats including malware as well as the functionality to enforce security policies regardless of what network the user device is connected to and without requiring a company to implement and maintain disparate, complex security solutions on premise and potentially across many segmented networks within the company's internal network. The cloud-based multi-function firewall system can also eliminate blind spots, enables traffic inspection, and enforces security policy for remote users connecting to cloud services as network traffic destined to cloud services traverses the system. Additionally, interfacing the company's computers and user devices with the cloud-based multi-function firewall system reduces the complexity and overhead needed to protect the company's devices and information and provides the capability for the company to configure security policies across their local network or to configure individual, customized policies for specific users or specific user devices.

Embodiments include configuring a cloud-based multi-function firewall system, in a secure cloud, between a user device and an insecure network, e.g., the Internet, to monitor and block malicious traffic as well as to enforce security policies between the insecure network and the user device. The cloud-based multi-function firewall system can be provided as a service to the user device to enable companies to retain the benefits provided by traditional on-premise firewall systems without incurring the associated disadvantages.

In some embodiments, the cloud-based multi-function firewall system can be configured to block detected malicious traffic as well as to enforce security policies to block specific network traffic in network communications between devices on an internal network by configuring the internal network as a private virtual network within the secure cloud. In some embodiments, network requests on the internal network can be forwarded to the cloud-based multi-function firewall system and routed within the private virtual network corresponding to the internal network. By doing so, the cloud-based multi-function firewall system can analyze and block certain network communications (e.g., network traffic detected as being potential or actual malicious threats, banned network traffic indicated in a security policy, etc.) between devices on the internal network and prevent the spread of malware on the internal network. Additionally, by managing each device's connection to the internal network, the cloud-based multi-function firewall system can be configured to effectively isolate a device detected to be compromised or transmitting malicious or potentially malicious network traffic.

In some embodiments, a method for providing a cloud-based multi-function firewall, includes: retrieving device information associated with a network-enabled device associated with a user; transmitting the user information and the device information from the network-enabled device to a secure cloud to configure a virtual private network (VPN) connection between the secure cloud and the network-enabled device; receiving cloud information from the secure cloud, the cloud information specifying a cloud server in the secure cloud and being generated by the secure cloud based on the device information; updating domain name service (DNS) and routing functions to forward network requests to the cloud server specified in the cloud information; and establishing the VPN connection to the secure cloud based on the cloud information, network traffic to and from the network-enabled device is routed through the VPN connection to the cloud-based multi-function firewall implemented on the cloud server.

In some embodiments, the cloud information is received via an application program interface (API) call.

In some embodiments, the cloud information includes a first domain name or a first Internet Protocol (IP) address of the cloud server. In some embodiments, establishing the VPN includes establishing the VPN connection based on the first domain name or the first IP address.

In some embodiments, the method further includes: receiving a network request generated at the network-enabled device, the network request including a second domain name or a second IP address; and transmitting the network request, via the VPN connection, to the cloud-based multi-function firewall implemented at the cloud server.

In some embodiments, the cloud-based multi-function firewall is configured to determine whether the network request is associated with a threat and whether the network request is allowed based on a security policy. In some embodiments, the cloud-based multi-based function firewall is configured to block the network request from being transmitted in response to determining that the network request is associated with a threat or disallowed based on the security policy. In some embodiments, the method further includes receiving a notification from the cloud server, the notification indicating that the network request is blocked by the cloud-based multi-function firewall.

In some embodiments, the method further includes: monitoring a device status and a network status, the device status and the network status each associated with the network-enabled device; determining that the device status or the network status being monitored indicates that the network-enabled device regains a network connectivity; and when the network-enabled device regains the network connectivity, reestablishing the VPN connection.

In some embodiments, the secure cloud is selected from a plurality of cloud servers in the secure cloud based on the device information, and attributes of one or more of the plurality of cloud servers. In some embodiments, the attributes of the cloud server includes one or more of: an IP address of the cloud server, a physical location of the cloud server, a network bandwidth, or a processing load of the cloud server.

In some embodiments, the device information includes one or more of an IP address associated with the network-enabled device, a MAC address associated with the network-enabled device, or a unique identifier associated with the network-enabled device.

In some embodiments, the network-enabled device includes a user device or an edge device.

In some embodiments, the network traffic includes a network request between the network-enabled device and another device on an external network with respect to the network-enabled device.

In some embodiments, the network traffic includes a network request between the network-enabled device and another network-enabled device on a same internal network.

In some embodiments, the secure cloud is configured to configure a private virtual network (VN) within the secure cloud to correspond to an internal network associated with the network-enabled device.

In some embodiments, the cloud server is configured to configure a virtual interface to enable the network-device to access the private VN via the VPN connection.

In some embodiments, the cloud server is configured to configure the virtual interface based on the user information or the device information.

In some embodiments, network traffic intended for the internal network is configured to be routed through the private VN.

In some embodiments, a method for providing a cloud-based multi-function firewall includes: receiving, from a network-enabled device, device information associated with the network-enabled device; selecting a first cloud server from a plurality of cloud servers in the secure cloud based on the device information; transmitting cloud information from the first cloud server to the network-enabled device, the cloud information identifying the first cloud server; and enabling the network-enabled device to establish a virtual private network (VPN) connection to the first cloud server, and network traffic to and from the network-enabled device is routed through the VPN connection to the cloud-based multi-function firewall implemented on the first cloud server.

In some embodiments, the cloud information includes a domain name or an Internet Protocol (IP) address of the first cloud server. In some embodiments, the VPN connection is established based on the domain name or the IP address of the first cloud server.

In some embodiments, the method further includes receiving, via the VPN connection, a network request from the network-enabled device, the network request being generated at the network-enabled device, the network request includes a requested domain name or a requested IP address; and analyzing, via the cloud-based multi-function firewall, the network request to determine whether a threat exists and whether the network request is allowed based on a security policy.

In some embodiments, the method further includes upon determining that the threat exists or that the network request is disallowed by the security policy, blocking the network request; and transmitting a notification to the network-enabled device, the notification indicating that the network request is blocked and associated with the threat.

In some embodiments, the method further includes receiving a first IP address from the network-enabled device; upon determining that the threat does not exist and that the network request is allowed, retrieving a second IP address associated with the first IP address; and generating a second network request to include the second IP address instead of the first IP address; and transmitting the second network request.

In some embodiments, the method further includes receiving attributes of one or more cloud server from the plurality of cloud servers; and selecting the first cloud server based on the attributes. In some embodiments, the attributes of the first cloud server include one or more of: an IP address of the secure cloud, a physical location of the first cloud server, a network bandwidth at the first cloud server, or a processing load of the first cloud server.

In some embodiments, the method further includes receiving a first IP address from the network-enabled device; receiving network data from an insecure network, the network data includes a second IP address associated with the first IP address; and analyzing, via the cloud-based multi-function firewall, the network data to determine whether a threat exists and whether the network data is allowed based on a security policy.

In some embodiments, the method further includes upon determining that the threat exists or that the network data is disallowed, blocking the network data; and transmitting a notification to the network-enabled device, the notification indicating that the network data is blocked and associated with the threat.

In some embodiments, the method further includes upon determining that the threat does not exist and that the network data is allowed, determining that the second IP address is associated with the first IP address; and transmitting the network data to the network-enabled device through the VPN connection associated with the first IP address.

In some embodiments, the network-enabled device includes a user device or an edge device.

In some embodiments, the network traffic comprises a network request between the network-enabled device and another device on an external network with respect to the network-enabled device.

In some embodiments, the network traffic comprises a network request between the network-enabled device and another network-enabled device on a same internal network.

In some embodiments, the secure cloud is configured to configure a private virtual network (VN) within the secure cloud to correspond to an internal network associated with the network-enabled device.

In some embodiments, the cloud server is configured to configure a virtual interface to enable the network-device to access the private VN via the VPN connection.

In some embodiments, the cloud server is configured to configure the virtual interface based on the user information or the device information.

In some embodiments, network traffic intended for the internal network is configured to be routed through the private VN.

In some embodiments, a system for providing a cloud-based multi-function firewall includes one or more processors, memory, and one or more programs stored in the memory and configured to be executed by the one or more processors, the one or more programs including instructions for: retrieving device information associated with a network-enabled device associated with a user; transmitting the device information from the network-enabled device to a secure cloud to configure a virtual private network (VPN) connection between the secure cloud and the network-enabled device; receiving cloud information from the secure cloud, the cloud information specifying a cloud server in the secure cloud and being generated by the secure cloud based on the device information; updating domain name service (DNS) and routing functions to forward network requests to the cloud server specified in the cloud information; and establishing the VPN connection to the secure cloud based on the cloud information, network traffic to and from the network-enabled device is routed through the VPN connection to the cloud-based multi-function firewall implemented on the cloud server.

In some embodiments, a system for providing a cloud-based multi-function firewall includes a second cloud server in a secure cloud, the second cloud server includes one or more processors, memory, and one or more programs stored in the memory and configured to be executed by the one or more processors, the one or more programs including instructions for: receiving, from the network-enabled device, device information associated with the network-enabled device; selecting a first cloud server from a plurality of cloud servers in the secure cloud based on the device information; transmitting cloud information from the first cloud server to the network-enabled device, the cloud information identifying the first cloud server; and enabling the network-enabled device to establish a virtual private network (VPN) connection to the first cloud server, and network traffic to and from the network-enabled device is routed through the VPN connection to the cloud-based multi-function firewall implemented on the first cloud server.

In some embodiments, a non-transitory computer-readable storage medium includes a security appliance client installed on a network-enabled device to provide a cloud-based multi-function firewall, the security appliance client includes instructions that when executed by the network-enabled device having one or more processors cause the one or more processors to perform instructions including: retrieving device information associated with a network-enabled device associated with a user; transmitting the user information and the device information from the network-enabled device to a secure cloud to configure a virtual private network (VPN) connection between the secure cloud and the network-enabled device; receiving cloud information from the secure cloud, the cloud information specifying a cloud server in the secure cloud and being generated by the secure cloud based on the device information; updating domain name service (DNS) and routing functions to forward network requests to the cloud server specified in the cloud information; and establishing the VPN connection to the secure cloud based on the cloud information, network traffic to and from the network-enabled device is routed through the VPN connection to the cloud-based multi-function firewall implemented on the cloud server.

In some embodiments, a non-transitory computer-readable storage medium includes instructions for providing a cloud-based multi-function firewall, the instructions, when executed by a first cloud server having one or more processors, cause the one or more processors to perform instructions including: receiving, from the network-enabled device, device information associated with the network-enabled device; selecting a first cloud server from a plurality of cloud servers in the secure cloud based on the device information; transmitting cloud information from the first cloud server to the network-enabled device, the cloud information identifying the first cloud server; and enabling the network-enabled device to establish a virtual private network (VPN) connection to the first cloud server, and network traffic to and from the network-enabled device is routed through the VPN connection to the cloud-based multi-function firewall implemented on the first cloud server.

BRIEF DESCRIPTION OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

DETAILED DESCRIPTION

Described herein are computer-readable storage mediums, systems, and methods for providing cloud-based multi-function firewalls capable of configuring a Zero Trust private virtual network (PVN) to protect devices communicating on an internal network. Embodiments include configuring a cloud-based multi-function firewall system, in a secure cloud, between a user device and an insecure network, e.g., the Internet, to monitor and block malicious traffic as well as to enforce security policies on network traffic between the insecure network and the user device. Additional embodiments include configuring the cloud-based multi-function firewall system to monitor for and block specific network traffic (e.g., detected malicious content, or banned network traffic indicted in a security policy, etc.) between devices on an internal network secured by the cloud-based multi-function firewall system. By doing so, a Zero Trust environment can be implemented within the internal network such that any network requests generated by a first device—including an internal network request directed to a second device on the same internal network as the first device—may be first routed to and analyzed by the cloud-based multi-function firewall system. The cloud-based multi-function firewall system can be provided as a cloud-based service for all of a company's devices to not only enable the company to retain the benefits provided by traditional on-premise firewall systems without incurring the associated disadvantages, but also enable the company to implement the Zero Trust environment for the company's internal network.

Figure 1:
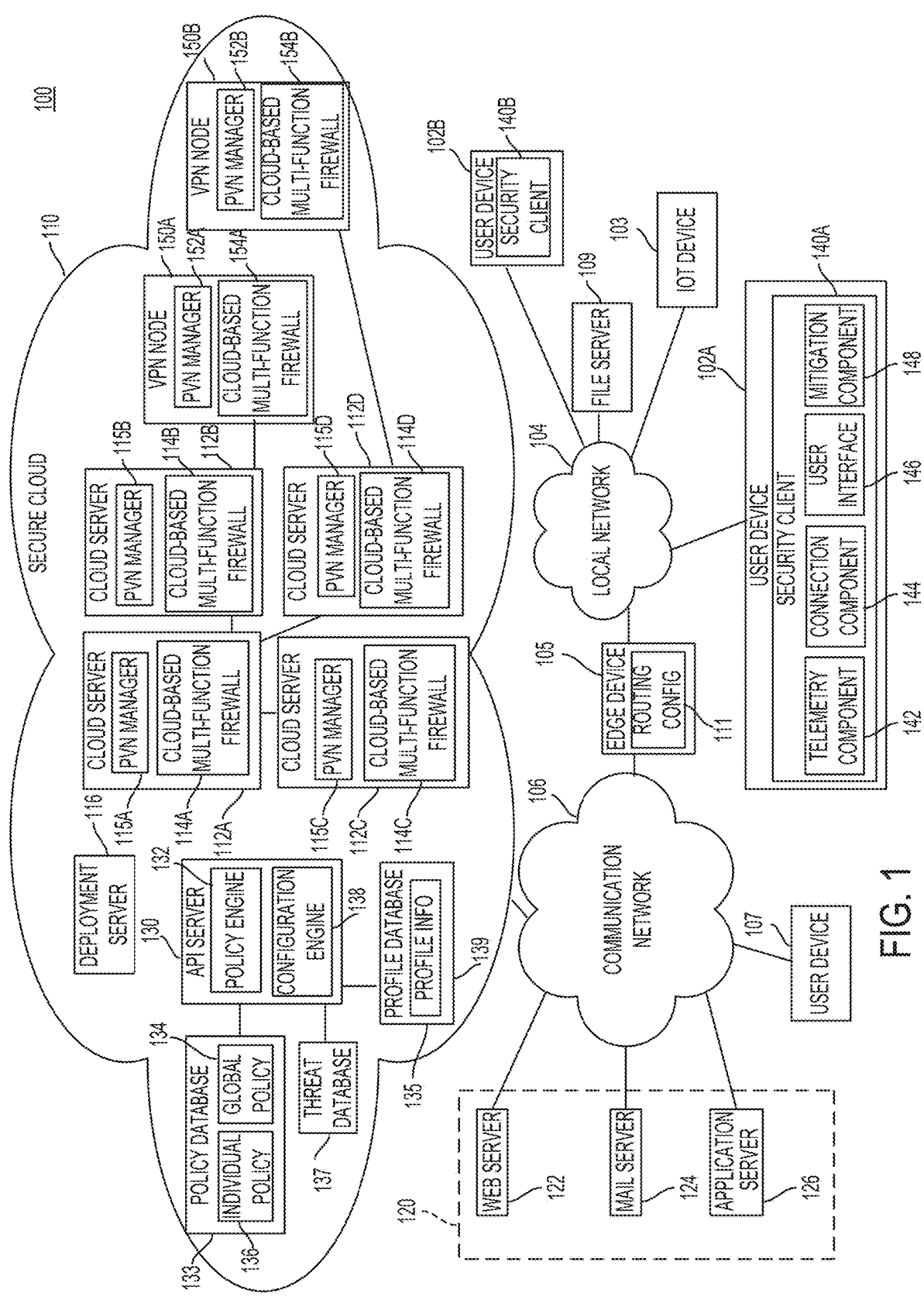
FIG. 1 illustrates a system for providing a cloud-based multi-function firewall, according to some embodiments.

FIG. 1 illustrates a system 100 for providing a cloud-based multi-function firewall, according to some embodiments. System 100 includes user devices 102A-B and 107, Internet of Things (IoT) devices 103, file server 109, a secure cloud 110, and data sources 120 that are each coupled directly or indirectly to communication network 106. Communications network 106 may include a local area network (LAN), a wide area network (WAN), the Internet, a Wi-Fi network, a WiMAX network, a cellular network (e.g., 3G, 4G, 4G Long Term Evolution (LTE), 5G, etc.), or a combination thereof. Further, communications network 106 may implement one or more wired and/or wireless standards or protocols. As shown in system 100, communication network 106 represents one or more insecure, external networks with respect to the devices coupled to local network 104. An external network may be a public network such as the Internet.

In some embodiments, local network 104 can be an internal network (which can be referred to as a private network or an intranet) that restricts network access to a defined set of users and associated devices. For example, local network 104 may be a corporate network accessible by only employees of a company. In this example, edge device 105, user devices 102A-B, file server 109, and IoT device 103 shown as being connected to local network 104 may be devices associated with the employees of the company.

Data sources 120 can include various servers that provide different types of services over communication network 106, such as the Internet. For example, data sources 120 can provide data requested by user device 102A or user device 107 over communication network 106. In some embodiments, data source 120 may include a web server 122 for providing web content, a mail server 124 for providing email access, or an application server 126 for providing various services over communication network 106. In some embodiments, a cloud-based multi-function firewall can be implemented in secure cloud 110 to monitor incoming and outgoing network traffic between devices on local network 104, such as user device 102A, and data sources 120. The cloud-based multi-function firewall can also be configured to secure incoming and outgoing network traffic between a device, such as user device 107, protected by secure cloud 110 and another device of data sources 120 accessible by communication network 106.

Additionally, the cloud-based multi-function firewall can be configured to secure incoming and outgoing network traffic between devices on an internal network (e.g., local network 104) being protected by secure cloud 110. For example, such devices may include user device 102A and file server 109. Such monitoring may be desirable because local network 104 typically does not detect or prevent threats (e.g. malware, DDoS attacks, among other attacks) from being exchanged between devices on local network 104.

In some embodiments, secure cloud 110 can include a network of remote servers hosted over the Internet or on a private network that provides shared computer processing resources (e.g., computer networks, servers, data storage, applications, and services). For example, secure cloud 110 may be provisioned within a cloud computing service such as Amazon Web Services (AWS), IBM SmartCloud, Microsoft Azure, Google Cloud Platform, etc. As shown in system 100, secure cloud 110 can include an application program interface (API) server 130 for interfacing with user devices 102A-B and 107 to configure one or more cloud-based multi-function firewalls 114A-D of corresponding cloud servers 112A-D to provide network-security functions to these devices. In some embodiments, the network-security functions can refer to the capability to detect and block security threats as well as the capability to enforce security policies to block certain network traffic identified in the security policies.

In some embodiments, API server 130 can be configured to interface other networked devices on local area network 104 (such as file server 109 and IoT device 103) with one or more of VPN nodes 150A-B to interface these networked devices to access the network-security functions provided within secure cloud 110, as will be further described below. For example, these network-security functions may be provided by one or more cloud-based multi-function firewalls 154A-B corresponding to the one or more VPN nodes 150A-B. In some embodiments, in contrast to user devices that may install software applications such as security client 140A, networked devices may refer to electronic devices on local network 104 and having limited processing capabilities or limited memory storage and cannot be operated to install such software applications. For example, these networked devices may include IoT devices 103 such as network-enabled outlets (i.e., "smart" plugs), network-enabled thermostat, networked-enabled light switches, etc.

Accordingly, cloud-based multi-function firewalls 112A-D and 154A-B can be network components (within cloud server 110) that not only can control a passage of network traffic by applying network-security functions, but also can control a routing path of allowed network traffic to provide a Zero Trust network, according to some embodiments. In some embodiments, the cloud-based multi-function firewalls in secure cloud 110 can be configured to apply the network-security functions to ingress and egress network traffic of a protected device such that the device remains secure from potential threats carried in external network requests originating outside of an internal network (with respect to the protected device) as well as potential threats carried in internal network requests originating from the internal network.

As further described below, to control whether network traffic is allowed, cloud-based multi-function firewalls 112A-D and 154A-B can determined whether a threat is detected in the network traffic and whether the network traffic is allowed by a security policy (e.g., associated with the devices originating the network traffic). Additionally, to determine whether a threat is detected and whether the security policy applies, multi-function firewalls 112A-D and 154A-B can be configured to decrypt any encrypted network traffic such that network-security functions can be provided to the network traffic. Therefore, cloud-based multi-function firewalls 112A-D and 154A-B, as discussed herein, may provide various network and network-security functions that are typically associated with a secure web gateway (SWG) or a web proxy.

Further, as will be described below with respect to FIG. 8, secure cloud 110 can include one or more deployment servers 116 utilized by API server 130 to propagate configuration files to one or more cloud servers 112A-D and VPN nodes 150A-B to update policy and threat databases used by one or more cloud-based multi-function firewall 112A-D and 154A-B to provide network-security functions to user devices 102A-B and 107 as well as to the other networked devices on local area network 104.

In some embodiments, to enable user devices 102A-B and 107 and other networked devices on local network 104 to access the network-security functions provided by one or more cloud-based multi-function firewalls 114A-D, API server 130 can implement a policy engine 132 and a configuration engine 138. Though policy engine 132 and configuration engine 138 are shown as being implemented within API server 130, these engines can be implemented on a plurality of servers in distributed or centralized system architectures.

In some embodiments, configuration engine 138 can be configured to communicate with, for example, user device 102A to dynamically facilitate a secure connection, e.g., a Virtual Private Network (VPN) connection, to be established between user device 102A and one of cloud servers 112A-112D in secure cloud 110. By enabling user device 102A to securely connect to, for example, cloud server 112A, configuration engine 138 may enable user device 102A to securely access the network-security functions provided by cloud-based multi-function firewall 114A implemented in cloud server 112A. The VPN connection may be implemented as an encrypted tunneled connection such that network communications between user devices 102A-B and 107 and secure cloud 110 remain secured from cyberattacks such as eavesdropping attacks.

In some embodiments, as discussed above, other networked device on local network 104 such as IoT devices 103 may not be capable of installing security clients 140A-B to dynamically connect to one of cloud servers 112A-D. Accordingly, to connect these networked devices to secure cloud 110 and to provide the network-security functions of the cloud-based multi-function firewalls to network communications to and from these networked devices, configuration engine 138 can be configured to enable an edge device 105 to securely connect to one or more predefined VPN nodes 150A-B on secure cloud 110, as further described below with respect to FIG. 3B. In some embodiments, VPN nodes 150A-B can include VPN routers that can each be configured to establish a plurality of VPN connections with a corresponding plurality of edge devices (e.g., edge device 105).

In some embodiments, edge device 105 can be configured to store routing configuration 111 that controls how ingress and egress network requests of a device on local network 104 is to be routed. In some embodiments, routing configuration 111 can be configured to store information used by edge device 105 to establish a VPN connection to, for example, VPN node 150A for routing certain types of network requests. For example, the VPN connection may be a LAN-to-LAN VPN tunnel (e.g., a LAN-to-LAN IPSec tunnel). In some embodiments, to determine whether a network request received at edge device 105 is to be routed through the VPN connection, edge device 105 can be configured to determine whether the network request is associated with secure cloud 110 based on routing configuration 111. For example, the network request may be associated with a private virtual network managed on secure cloud 110. In another example, the network request may include a source or a destination identifier identified within routing configuration 110 to be associated with the VPN connection.

Accordingly, qualifying network requests to and from the networked devices may be routed by edge device 105 through the VPN connection to VPN node 150A, at which cloud-based multi-function firewall 154A can be configured to analyze the network requests to apply network-security functions (e.g., detect potential security threats or to apply user-configured security policies). In some embodiments, the networked devices can be configured to include the cloud-based ID within all network requests such that all network requests are forced by edge device 105 to traverse secure cloud 110.

In some embodiments, cloud-based multi-function firewall 154A may operate similar to cloud-based multi-function firewalls 114A-D and apply individual policy 136 or global policy 134 associated with edge device 105 to the network requests. By routing network requests through the secure VPN connection, edge device 105 can secure network requests from networked devices on local network 104 from security threats such as eavesdropping attacks and enable network-security functions to be implemented for network traffic associated with networked devices.

In some embodiments, configuration engine 138 can be configured to receive device information (e.g., an IP address of user device 102A, a unique identifier associated with user device 102A, or a MAC address of user device 102A) and/or user information (e.g., a user account identifier associated with a user operating user device 102A) from user device 102A. Based on the device information or user information, configuration engine 138 can verify that user device 102A is permitted to access the network-security functions provided by one or more cloud servers 112A-D. In some embodiments, based on the device information, configuration engine 138 can select a cloud server, e.g., cloud server 112A, from cloud servers 112A-D to provide the network-security functions to user device 102A. In some embodiments, the selection can be based on the device information (e.g., the IP address or the unique identifier), location information associated with the user device, and one or more attributes of the one or more cloud servers 112A-D (e.g., location information, a processing load, a network bandwidth, a latency, an exponential backoff time, etc.) or a combination thereof.

In some embodiments, configuration engine 138 can be configured to select the cloud server from a subset of the cloud servers 112A-D specified for that user device 102A. For example, the subset of cloud servers 112A-D may include cloud servers from a specific physical location (e.g., in the US) or with specific processing capabilities. The criteria for selecting this subset may be user configurable and associated with security client 140A or user device 102A or devices associated with local network 104.

In some embodiments, upon selection of, for example, cloud server 112A, configuration engine 138 can be configured to transmit, to user device 102A, cloud information indicating the selected cloud server 112A. Accordingly, based on a real-time status of cloud servers 112A-D and information transmitted by user devices 102A-B and 107, configuration engine 138 may select a different cloud server for each of user devices 102A-B and 107. Additionally, configuration engine 138 may select a different cloud server for the same user device 102A depending on when the selection is performed.

In some embodiments, policy engine 132 can manage policy information (e.g., global policy 134 and individual policy 136) stored in policy database 133, threat information stored in threat database 137, and profile information 135 stored in profile database 139 to configure cloud-based multi-function firewalls 114A-D to provide user-configurable network-security functions for user devices 102A-B and 107 and networked devices (e.g., IoT device 103) on local network 104. Further, policy engine 132 can configure cloud-based multi-function firewalls 114A-D and 154A-B to not only provide threat detection and blocking of network traffic, but also provide detection of threats stored at user devices 102A-B and 107 and the networked devices, respectively, and mitigation (e.g., removal) of such detected threats.

In some embodiments, threat database 137 can include information specifying identified threats and one or more attributes associated with these identified threats. For example, threat database 137 may include a plurality of IP addresses known to be threats, a plurality of bit patterns associated with threats, a plurality of file hashes associated with threats, etc. In some embodiments, threats can be added to threat database 137 upon verifying the threats, as described with respect to FIGS. 6 and 7. In some embodiments, API server 130 can request one or more deployment servers 116 to propagate updates made to threat database 137 to each of cloud servers 112A-D to enable corresponding cloud-based multi-function firewalls 114A-D to stay current on identified threats.

In some embodiments, policy database 133 can include one or more databases for storing global policy 134 and individual policy 136. In some embodiments, global policy 134 can include a plurality of rules associated with applying network-security functions. For example, these rules may be associated with identifying and responding to the plurality of known threats stored in threat database 137. In another example, the rules may be associated with identifying and responding to certain network traffic. In some embodiments, a rule can include an associated action such as permit, block, flag, or log network traffic, or a combination thereof. In some embodiments, API server 130 can request one or more deployment servers 116 to propagate updates made to global policy 132 to each of cloud servers 112A-D to enable corresponding cloud-based multi-function firewalls 114A-D to respond (e.g., block) to the plurality of known threats identified in threat database 137 or to enforce a security policy.

In some embodiments, as described above, to implement a Zero Trust environment within local network 104, secure cloud 110 can be configured to create and manage a private virtual network (VN) associated with an internal network—such as local network 104—a for routing network traffic intended for local network 104. To do so, individual policy 136 can be configured to store a private VN identifier associated with a user device, an edge device, or a user account associated with one or more user devices or edge devices on the internal network. The private VN ID may identify the specific private VN in secure cloud 110 for replacing the corresponding local network 104.

In some embodiments, individual policy 136 can include a plurality of rules or preferences specific to a user device, an edge device, or a user account. In some embodiments, these rules can include network-security function rules (as described above) and private virtual network (VN) rules. In some embodiments, network-security function rules can specify allowable and banned interactions (e.g., inbound or outbound network requests) between devices on local network 104 and data sources 120 in an external network such as communication network 106. In some embodiments, these rules can be user configurable and allow one or more security policies to be applied to ingress and egress network requests on the internal network of local network 104. For example, a security policy may be to block social media sites such as "Facebook.com", which may or may not be associated with a malicious threat.

In some embodiments, the private VN rules can specify whether and how network requests are to be routed in one or more private VNs configured in secure cloud 110. In some embodiments, the private VN rules may specify whether devices on local network 104 can communicate with each other in the private VN configured within secure cloud 110 to replace local network 104. In some embodiments, the private VN rules may also specify whether specific network traffic between devices on local network 104 need to be routed through the private VN corresponding to local network 104 or whether such network traffic can be allowed to traverse local network 104. In some embodiments, private VN rules that specify how network requests are to be routed in secure cloud 110 can include information associated with cloud server capabilities (e.g., processing capacity or routing functions), cloud server settings (e.g., a subset of cloud servers selected by a user), network performance settings (e.g., network bandwidth), or a combination thereof.

In some embodiments, individual policy 136 can be stored in one or more tables, within one or more policy databases 133, associated with a user device or with a user account. In some embodiments, policy engine 132 can be configured to transmit information indicating individual policy 136 associated with a user device (e.g., user device 102A) to a cloud server (e.g., cloud server 112A) selected by configuration engine 138 to provide network-security functions to the user device. For example, policy engine 132 may be configured to transmit such information after the VPN connection between the user device and the cloud server has been established. Similarly, once a VPN connection has been established between an edge device (e.g., edge device 105) and a VPN node (e.g., VPN node 150A), policy engine 132 can be configured to transmit information indicating individual policy 136 associated with the edge device to the VPN node for use by the cloud-based multi-function firewall on that VPN node.

Accordingly, cloud-based multi-function firewall 114A can be configured to analyze network traffic transmitted to and from user device 102A based on threat information in threat database 137, information in global policy 134, and information in individual policy 136 specific to user device 102A. Similarly, cloud-based multi-function firewall 154A can be configured to analyze network traffic transmitted to and from edge device 105 based on threat information in threat database 137, information in global policy 134, and information in individual policy 136 specific to edge device 105. For example, such network traffic may originate from or be intended for networked devices on local network 104 such as IoT device 103.

In some embodiments, profile database 139 can store profile information 135 specific to a user device (e.g., user device 102A or 107) or a user account (e.g., a user account may be associated with one or both of user devices 102A and 107, or the user account may be associated with edge device 105). Profile information 135 associated with the user device, such as user device 102A, can include telemetry data transmitted from the user device to policy engine 132. In some embodiments, the telemetry data of, for example, user device 102A can include file information at user device 102A, process information at user device 102A, and network traffic information at user device 102A. For example, file information may include file names, file sizes, file location, and one or more hashes of the file. For example, process information may include a name of a process running on user device 102A and behavior (e.g., resource usage, processing load, memory consumption, power consumption, etc.) For example, network information may include DNS calls and data transfers, etc. In some embodiments, profile information 135 can be analyzed by policy engine 132 to determine whether one or more user devices are infected by a threat.

In some embodiments, profile information 135 associated with a specific user device such as user device 102A can be managed and maintained at a cloud server, e.g., cloud server 112A, selected to provide user device 102A network-security functions. In some embodiments, when user device 102A disconnects from the selected cloud server 112A, cloud server 112A can be configured to transmit the profile information to policy engine 132 that updates profile information 135 associated with user device 102A.

In some embodiments, policy engine 132 can be configured to receive and process alerts generated by cloud-based multi-function firewalls 114A-D on one or more cloud servers 112A-D or generated by cloud-based multi-function firewall 154A-B from VPN nodes 150A-B. As will be further described with respect to FIG. 5B, an alert can indicate specific network traffic is associated with a detected threat or that the network traffic is suspicious or anomalous and may potentially be associated with a threat. In some embodiments, the alert may indicate specific network traffic that is blocked based on an enforced security policy stored in individual policy 136 or global policy 134. In some embodiments, as will be further described with respect to FIG. 6, policy engine 132 can implement one or more machine learning algorithms to verify any threats indicated in the alert and verify whether a potential threat indicated in the alert is actually a threat. In some embodiments, once one or more threats are verified, policy engine 132 can be configured to update threat database 137 and global policy 134 in policy database 133. Then, policy engine 132 can be configured to request one or more deployment servers 116 to propagate information indicating the confirmed threats to each of cloud servers 112A-D. Therefore, the efficacy of cloud-based multi-function firewalls 114A-D in detecting threats can be increased in the future.

In some embodiments, upon verifying one or more threats, policy engine 132 can analyze profile information 135 associated with each user device or user account to determine whether any user device has been previously impacted by the threat. For example, profile information 135 for user device 102A may indicate that user device 102A has previously received, stored, or executed a data file determined by policy engine 132 to be associated with a threat. In some embodiments, upon determining an impacted user device, policy engine 132 can configure a cloud server providing network-security functions for user device 102A to transmit one or more commands to address the threat by, for example, removing the data file at user device 102A. In some embodiments, as discussed above, profile information 135 for a specific user device can be maintained, stored, and analyzed by a cloud server selected to provide network-security functions to that user device.

In some embodiments, as shown in system 100, a plurality of cloud servers 112A-D and VPN nodes 150A-B can implement a corresponding plurality of cloud-based multi-function firewalls 114A-D and 154A-B, respectively. In some embodiments, a cloud server can be implemented as one or more virtual machines operating one or more processors. In some embodiments, a cloud-based multi-function firewall can be configured to determine whether an actual or potential threat exists in network traffic or on the user device. For example, as discussed above, user device 102A may be securely coupled to cloud server 112A using a VPN connection. In this example, as discussed above, cloud-based multi-function firewall 114A may receive information associated with: threat database 137, global policy 134, and individual policy 136 specific to user device 102A. Then, cloud-based multi-function firewall 114A can be configured to analyze network traffic between user device 102A and data sources 120, as further described with respect to FIGS. 3A, 4, and 5A-B. In some embodiments, any network traffic between data sources 120 and user device 102A can be automatically routed to, for example, cloud server 112A, selected for user device 102A, to be inspected by cloud-based multi-function firewall 114A to apply network-security functions. For example, user device 102A may be prevented from being exposed to threats such as malware, DDOS attacks, eavesdropping, and the like. In some embodiments, to implement the Zero Trust environment in local network 104, network traffic between user device 102A and another devices on local network 104 may also be routed to cloud server 112A selected for user device 102A.

In some embodiments, a VPN node can be implemented as a VPN router configured to establish to establish a VPN connection with edge devices such as edge device 105, as discussed above. Therefore, much like cloud server 112A that provides cloud-based multi-function firewall 114A for user devices 102A-B and 107, an example VPN node 150A can provide cloud-based multi-function firewall 154A for edge device 105 connected to VPN node 150A. As discussed above and further described below with respect to FIGS. 5A-B, cloud-based multi-function firewall 154A may be configured to operate similar to multi-function firewall 112A.

In some embodiments, cloud-based multi-function firewall 114A can be configured to maintain, at cloud server 112A, profile information 135 associated with user device 102A. Accordingly, cloud-based multi-function firewall 114A may detect whether user device 102A was previously impacted by a threat by analyzing profile information of user device 102A.

In some embodiments, to implement the Zero Trust network for local network 104 such that internal network requests on local network 104 are routed and processed within secure cloud 110, secure cloud 110 can be configured to create and manage a private VN corresponding to local network 104. In some embodiments, this private VN may be identified by a private VN ID stored in individual policy 136 and associated with one or more devices (e.g., user devices 102A-B, user device 107, file server 109, IoT devices 103, etc.) or one or more user accounts associated with the one or more devices. In some embodiments, to create and manage a plurality of private VNs corresponding to a plurality of local networks, each of cloud servers 112A-D and VPN nodes 150A-B can include private virtual network (PVN) managers 115A-D and 154A-B, respectively.

In some embodiments, when a device connects to a cloud server or a VPN node, the respective PVN manager can be configured to generate a virtual interface to connect the device to the private VN associated with that device. For example, when edge device 105 connects to VPN node 150A, PVN manager 152A may determine that edge device 105 is associated with a private VN ID corresponding to local network 104. Upon making this determination, PVN manager 152A may create a virtual interface for edge device 105 and having that private VN ID such that network requests to and from edge device 105 can be routed through the private VN managed on secure cloud 110.

In some embodiments, to create and simultaneously manage the plurality of private VNs on secure cloud 110, PVN managers 115A-D and 152A-B can implement Virtual Extensible LAN (VXLAN) protocols to overlay the private VN on top of the network in secure cloud 110. In some embodiments, upon receiving a network request, each PVN manager 115A-D and 152A-B may be configured to determine a source of the network request and route the network request on a private VN associated with the determined source. In some embodiments, to interface network requests from devices with a corresponding private VN, each of PVN manager 115A-D and 152A-B may maintain a plurality of virtual interfaces corresponding to respective private VNs and route network traffic among the virtual interfaces having the same private VN IDs. For example, the source of the network request may be associated with a private VN ID corresponding to a private VN. Accordingly, because each local network 104 can be implemented as a private VN overlaid on top of the network topology of secure cloud 110, network traffic within each private VN remain separate from network traffic in other private VNs even though the same cloud server or VPN node may be routing network traffic associated with multiple private VNs. In some embodiments, PVN managers 115A-D and 152A-B may be configured to implement VXLANs with a Multiprotocol Border Gate Protocol (MP-BGP) Ethernet Virtual Private Network (EVPN) control plane for VXLANs.

User devices 102A-B and 107 can include a computing device such as a desktop computer, a laptop computer, a tablet computer, a mobile device such as a smart phone, or the like. In some embodiments, user device 102A includes one or more wireless interfaces for accessing communication network 106 to communicate with data sources 120 and one or more servers (e.g., API server 130 and one or more of cloud servers 112A-D) in secure cloud 110. For example, the one or more wireless interfaces may enable user device 102A to utilize Wi-Fi, Ethernet, LTE, 3G, Bluetooth, among other wired or wireless communication protocols. In some embodiments, user device 102A connects to a local network 104 (e.g., an intranet) that connects to an external, insecure network, i.e., communication network 106. In some embodiments, an edge device 105 can be implemented between the local network 104 and the external, insecure communication network 106 to enable user devices such as user device 102A and 103 to communicate with data sources 120 over communication network 106. In some embodiments, edge device 105 can include one or more devices that connects local network 104 to external networks such as communication network 106 and secure cloud 110. For example, edge device 105 may include an edge router or a gateway. As discussed above, edge device 105 may enable networked devices (e.g., IoT devices 103) of local network 104 to interface with secure cloud 110. As described above, traditional firewalls are implemented in hardware typically at a gateway (e.g., edge device 105) or at a host server coupled to local network 104. Embodiments being contemplated in this disclosure implement cloud-based multi-function firewalls 114A-D in servers, such as cloud servers 112A-D, located remotely from user devices 102A-B and 107.

In some embodiments, user device 102A can install a security client 140A that enables user device 102A to access network-security functions provided by one or more cloud-based multi-function firewalls 114A-D in secure cloud 110. In some embodiments, security client can include the following components: telemetry component 142, connection component 144, user interface 146, and mitigation component 148.

In some embodiments, as discussed above and will be further described below with respect to FIG. 2, connection component 144 can be configured to interface with configuration engine 138 to set up a secure connection such as a VPN connection between user device 102A and a cloud server, such as cloud server 112A, in secure cloud 110 and selected by API server 130. The VPN connection may enable network traffic approved by cloud-based multi-function firewall 114A to be communicated to and from user device 102A securely. In some embodiments, PVN manager 115A on cloud server 112A may be configured to determine whether user device 102A is associated with a private VN ID based on individual policy 136 associated with user device 102A or a user account associated with user device 102A. In response to determining that private VN ID, PVN manager 115A can configure a virtual interface for user device 102A to connect user device 102A to the private VN maintained in secure cloud 110 and identified by the private VN ID.

Upon establishing the VPN connection, any network request generated at user device 102A may be first routed to cloud server 112A via the VPN connection. In some embodiments, these network requests may be an external network request directed to data source 120 on an external communication network 106. In some embodiments, these network requests may include an internal network request directed to another device connected to the same local network 104 as user device 102A. In some embodiments, to provide the Zero Trust network for local network 104, connection component 144 can be configured to block network communications that are not sent from secure cloud 110. In some embodiments, upon receiving a routed network request, cloud-based multi-function firewall 114A may analyze the network request and apply network-security functions on the network requests. For example, network requests that are determined to be threat-free and are not blocked by security policies may be allowed. Upon determining a network request to be threat-free, cloud-based multi-function firewall 114A can determine whether the network request is an external network request or an internal network request.

If the network request is determined to be an external network request, cloud-based multi-function firewall 114A may route the network request to an insecure network like communication network 106. Additionally, upon establishing the VPN connection, any network data sent by data source 120 and intended for user device 102A may be first sent to cloud-based multi-function firewall 114A for processing. In some embodiments, network data that has been inspected by cloud-based multi-function firewall 114A to be threat-free can be forwarded to user device 102A via the VPN connection.

If the network request is determined to be an internal network request, PVN manager 115A may use the configured virtual interface to route the network request to the private VN associated with user device 102A. As discussed above, PVN managers 115A-D and 152A-B within secure cloud 110 can be configured to manage overlaid private VNs and route network traffic through the virtual interfaces. In some embodiments, the internal network request may be directed from a first device to a second device on local network 104. The internal network request may be routed in the overlaid private VN until a receiving PVN manager determines that the second device is associated with a virtual interface maintained at that receiving PVN manager. When this occurs, the receiving PVN manager can be configured to transmit the network request to the second device.

In some embodiments, telemetry component 142 can be configured to interface with policy engine 132 or a cloud server such as cloud server 112A selected for providing network-security functions to user device 102A. In some embodiments, telemetry component 142 can monitor information gathered at user device 102A including, for example, one or more of the following: file information at user device 102A, process information at user device 102A, and network traffic information at user device 102A, etc. Then, telemetry component 142 can be configured to on-demand or periodically telemeter monitored information to policy engine 132 or cloud server 112A selected for providing network-security functions to user device 102A. As discussed above, cloud-based multi-function firewall 114A may maintain a profile for user device 102A based on the telemetered information for use in determining whether user device 102A was previously impacted by a threat. In some embodiments, telemetry component 142 can be configured to transmit telemetry data to cloud server 112A that then forwards the telemetry data to API server 130.

In some embodiments, mitigation component 148 can be configured to receive commands from API server 130 or one or more of cloud servers 112A-D. For example, as described above, policy engine 132 may determine that user device 102A was previously exposed to a threat. In response, policy engine 132 may issue one or more commands to security client 102A to instruct user device 102A to address (e.g., remove) the identified threat. In some embodiments, mitigation component 148 may receive and execute the one or commands from API server 130. In some embodiments, mitigation component 148 may receive the one or more commands through the VPN connection maintained between user device 102A and, for example, cloud server 112A.

In some embodiments, mitigation component 148 can be configured to receive commands from a connection to the API server to respond to identified threats. If any such command has been generated by the API server, mitigation component 148 may retrieve and execute these commands.

In some embodiments, security client 140A includes user interface 146 that allows a user operating user device 102A to view statistics related to alerts and threats detected by one or more cloud-based multi-function firewalls 114A-D and API server 130. In some embodiments, user interface 146 may enable the user to select security rules or preferences to include in individual policy 136 specific to user device 102A or a user account of the user. Further, user interface 146 may enable the user select the type of telemetry information for transmitting to cloud server 112A, according to some embodiments. In some embodiments, user interface 146 can be configured to allow a user having appropriate credentials to manage and view statistics associated with edge device 105 and other networked devices in communication with edge device 105. In some embodiments, user interface 146 may enable the user to select security rules or preferences to include in individual policy 136 specific to edge device 105 or to specific networked devices. For example, one or more network routing exceptions may be established for certain types of internal network requests on local network 104 such that not all internal network request need to be routed through a private VN corresponding to local network 104. For example, user device 102A may be downloading large files from file server 109 and user interface 146 may allow the user to direct network routing of the network communications between user device 102A and file server 109 to remain on local network 104 for the specific downloading requests. In some embodiments, some or all of the functionality of user interface 146 can be provided by a web portal provided by a web server in secure cloud 110. For example, a user operating user device 102A may access the web portal by connecting to the web server through a web browser.

Figure 2:
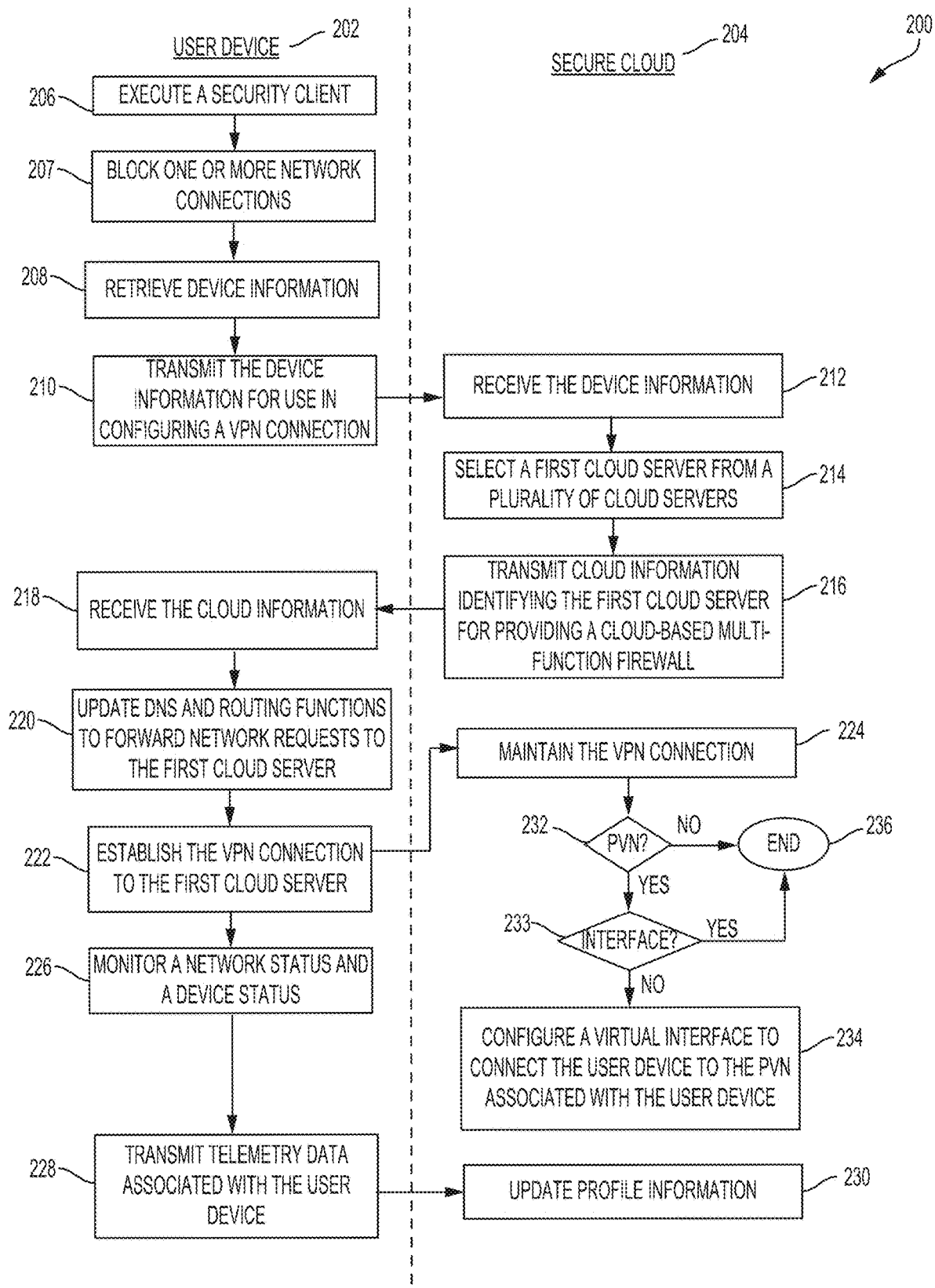
FIG. 2 illustrates a method for providing a cloud-based multi-function firewall, according to some embodiments.

FIG. 2 illustrates a method 200 for providing a cloud-based multi-function firewall, according to some embodiments. In some embodiments, a user device 202 can communicate with one or more servers (e.g., API server 130 of FIG. 1) in a secure cloud 204 (e.g., secure cloud 110 of FIG. 1) to configure the cloud-based multi-function firewall. In some embodiments, method 200 may be performed by various components of system 100 as described with respect to FIG. 1. For example, user device 202 and secure cloud 204 may correspond to user device 102 (or user device 103) and secure cloud 110, respectively, as shown in FIG. 1. For ease of explanation, steps of method 200 may be described below with reference to other components of system 100 as shown in FIG. 1.

In step 206, user device 202 executes a security client, such as security client 140A. In some embodiments, user device 202 can download and install the security client from a communication network, such as communication network 106. In some embodiments, the security client may be executed on startup of user device 202.

In step 207, the security client blocks one more network connections provided by user device 202. In some embodiments, a connection component (e.g., connection component 144 of FIG. 1) of security client detects one or more available network connections and blocks any detected network connections. In some embodiments, the connection component blocks all detected network connections to prevent user device 202 from accessing an external, insecure network (e.g., the Internet) before security client establishes a secure connection to secure cloud 204, as will be described below. In some embodiments, a detected network connection may include a connection to a device on an internal network (i.e., an internal network request) such as local network 104. By blocking such network connections before user device 202 has connected to secure cloud 204, the connection component may enable a Zero Trust network to be implemented such that even network requests that remain within an organization's internal network are treated as insecure network request before they are analyzed by one or more cloud-based multi-function firewalls in secure cloud 110. In some embodiments, an internal network request fitting specific criteria can be configured by the user through a user interface (e.g., user interface 146) of the security client to be allowed on local network 104.

In step 208, the security client (e.g., connection component 144) retrieves device information associated with user device 202. In some embodiments, the device information includes data identifying user device 202 such as an IP address, a MAC address, or a unique identifier stored in the security client. For example, when user device 202 installs the security client, the security client may be downloaded with the unique identifier. In some embodiments, in addition to the device information, the security client can retrieve user information that includes data associated with a user account (e.g., a user account ID) owned by the user operating user device 202.

In step 210, the security client (e.g., connection component 144) transmits the retrieved device information to secure cloud 204 for use in configuring a virtual private network (VPN) connection between user device 202 and secure cloud 204.

In some embodiments, to transmit the device information, the security client can make a DNS request to a DNS server or device to identify an Internet Protocol (IP) address associated with secure cloud 204. The DNS request may include a predetermined domain name that is stored on the security client and that specifies a server (e.g., API server 130) in secure cloud 204. In some embodiments, the security client transmits the request to the IP address of secure cloud 204. In some embodiments, the security client can also transmit the user information for use in configuring the VPN connection.

In step 212, secure cloud 204 receives the device information. In some embodiments, an API server (e.g., API server 130) in secure cloud 204 may perform the receiving. In some embodiments, a configuration component (e.g., configuration engine 138) in the API server can verify and authenticate user device 202 based on the device information.

In step 214, the API server (e.g., configuration engine 138) selects, from a plurality of cloud servers in secure cloud 204, a first cloud server for providing the VPN connection between user device 202 and to secure cloud 204. In some embodiments, the VPN connection to be established between user device 202 and the first cloud server can be used by the first cloud server to provide network-security functions to user device 202. In some embodiments, the API server can select the first cloud server based on the user information, device information, attributes of one or more of the cloud servers, or a combination thereof. In some embodiments, the attributes of a cloud server can include one or more of the following: a network bandwidth, a physical location, a processing capacity, a processing load, an exponential backoff time, or a combination thereof. In some embodiments, the API server can select the first cloud server to reduce a network latency of the VPN connection between user device and secure cloud 204. For example, the first cloud server can be selected to be a cloud server that: is physically located closest to user device 202, has a high available communication bandwidth, has a low processing load, or a combination thereof. In some embodiments, the API server can select the first server to load balance the processing performed across the cloud servers in secure cloud 204.

In step 216, the API server (e.g., configuration engine 138) transmits, to user device 202, cloud information identifying the first cloud server selected to provide a cloud-based multi-function firewall. In some embodiments, the cloud information includes a domain name or an IP address associated with the first cloud server. In some embodiments, the API server may query a table or a database of routing mappings to determine the information identifying the first cloud server. In some embodiments, the cloud information can be transmitted in the form of a configuration file.

In step 218, the security client (e.g., connection component 144) receives the cloud information. In some embodiments, the security client can receive the cloud information via one or more API calls.

In step 220, the security client (e.g., connection component 144) updates DNS and routing functions at user device 202 based on the cloud information to forward network requests to the first cloud server. In some embodiments, the security client updates the DNS and routing functions such that all DNS requests or IP address requests are redirected to the domain name or the IP address of the first cloud server.

In step 222, the security client (e.g., connection component 144) establishes the VPN connection to the first cloud server based on the received cloud information. In some embodiments, the VPN connection can be implemented according to one of a point-to-point tunneling protocol (PPTP), layer 2 tunneling protocol (L2TP), secure sockets layer (SSL), or Internet Protocol security (IPsec), or other VPN protocols. In some embodiments, the type of VPN connection can be selected by a user via a user interface (e.g., user interface 146) in the security client. In some embodiments, as will be further described with respect to FIGS. 3A and 4, any network traffic between user device 202 and an insecure network, such as communication network 106 or the Internet, or between user device 202 and another device on the same local network as user device 202 can be configured to be routed through the VPN connection. For example, the network traffic may include network requests generated by user device 202 or network data through and obtained from the insecure network. In some embodiments, by establishing the VPN connection, user device 202 can access the network-security functions provided by the cloud-based multi-function firewall implemented by the first cloud server in secure cloud 204.

In step 224, secure cloud 204 maintains the VPN connection to communicate with user device 202. In some embodiments, the first cloud server maintains the VPN connection. As will be further described with respect to FIG. 4, any network traffic intended for user device 202 may be first analyzed and processed by the cloud-based multi-function firewall implemented at the first cloud server before being routed to user device 202 via the VPN connection. As discussed above, such network traffic may include external network requests originating from outside of local network 104 (e.g., from web server 122 or mail server 124) and internal network requests originating in local network 104 (e.g., from user device 102B or IoT device 103 on the same local network as user device 202).

In some embodiments, as described with respect to FIG. 1, the first server can receive, from the API server, individual policy (e.g., individual policy 136) associated with user device 102A or a user account to configure the cloud-based multi-function firewall to perform user-configurable network-security functions. In some embodiments, the individual policy may include rulesets for allowable network traffic such as access to specific types of applications or web resources. For example, the individual policy may indicate that user device 202 cannot issue network requests to access social media websites or a specific type of mail server 124 such as a Gmail server. In some embodiments, the individual policy may indicate whether user device 202 belongs to a private virtual network (VN).

In step 232, the first server determines whether user device 202 is associated with the private VN. For example, a PVN manager (e.g., PVN manager 115A) on the first server may determine that the individual policy for user device 202 indicates a private VN ID identifying the private VN. If such an association is determined, method 200 proceeds to step 233. Otherwise, method 200 ends at step 236.

In step 233, the first server determines whether a virtual interface for connecting with the private VN exists for user device 202. If not, method 200 proceeds to step 234. Otherwise, method 200 ends at step 236.

In step 234, the first server configures the virtual interface to connect user device 202 to the private VN configured within secure cloud 204. In some embodiments, the virtual interface may be assigned an interface ID to associate with the private VN ID to link the virtual interface with the private VN. As discussed above, by configuring this virtual interface, the servers within secure cloud 204 (e.g., including cloud servers and VPN nodes), can be configured to route network traffic within the same private VNs by routing network traffic among virtual interfaces to configure a private VN to correspond to the local network (e.g., local network 104) associated with user device 202.

In step 226, the security client (e.g., connection component 144) monitors a network status and a device status associated with user device 202. In some embodiment, the network status indicates whether user device 202 is actively connected to a communication network. For example, the network status may indicate whether user device 202 can successfully connect to the communication network via a network connection. For example, the network connection may be provided to user device 202 via a wireless access point, a router, a gateway, a base station, or other devices enabling access to the communication network. The network status may also indicate a type of network connection (e.g., Ethernet or Wi-Fi) accessible to user device 202 for maintain the VPN connection. In some embodiments, the security client can track the network status and detect a change in the network status. In some embodiments, the device information includes a device status indicating an operating state of the device. For example, the device status of user device 202 may be one of a sleep mode, a hibernate mode, or the like.

In some embodiments, the security client (e.g., connection component 144) can respond to a change in the network status or the device status to re-establish a VPN connection to secure cloud 204 should a current VPN connection be disconnected. For example, if user device 202 switches a type of network connection or enters a specific operating mode (e.g., sleep or hibernate), user device 202 may lose network connectivity and the current VPN connection may be dropped. In some embodiments, the security client running on user device 202 can periodically or continually perform monitoring the device status and network status. Then, upon detecting that user device 202 regains network connectivity based on a change in the device status or the network status, the security client can automatically perform steps 208, 210, 218, 220, and 222 to re-establish the VPN connection between user device 202 and secure cloud 204.

In step 228, the security client (e.g., telemetry component 142) transmits telemetry data associated with user device 202. In some embodiments, the security client monitors telemetry data gathered at user device 202. In some embodiments, telemetry data includes information gathered at user device 102A including one or more of the following: file information at user device 102A, process information at user device 102A, and network traffic information at user device 102A. For example, file information may include file names, file sizes, file location, and one or more hashes of the file. For example, process information may include name of a process running on user device 102A and behavior (e.g., resource usage, processing load, memory consumption, power consumption, etc.) For example, network information may include DNS calls, data downloads, and data transfers, etc. In some embodiments, telemetry data includes user behavior, device behavior, or results of one or more anti-virus or anti-malware applications running at user device 102A. In some embodiments, the security client can securely transmit the telemetry data (gathered at user device 202) to the first cloud server via the VPN connection established in step 222. In some embodiments, the telemetry data received at the first cloud server can be routed from the first cloud server to the API server for further processing.

In step 230, secure cloud 204 can update profile information for user device 202 based on the telemetry data. In some embodiment, the first cloud server updates the profile information to be analyzed by the cloud-based multi-function firewall at the first cloud server. Accordingly, in addition to monitoring and blocking network traffic associated with threats, the cloud-based multi-function firewall can also analyze the profile information of user device 202 to determine whether user device 202 was previously exposed to a known threat. In some embodiments, the first cloud server forwards the telemetry data to the API server that updates a profile database (e.g. profile database 139) storing profiles associated with user device 202.

In some embodiments, secure cloud 204 can utilize the VPN connection between user device 202 and the first cloud server to issue one or more commands to address, e.g., remove, threats identified on user device 202. For example, a key file for removing ransomware may be determined in secure cloud 204. The first cloud server may distribute the key file to the security client on the user device 202 in the one or more commands to enable user device 202 to nullify and remove any ransomware present on user device 202. For example, a mitigation component (e.g., mitigation component 148) in the security client can be configured to receive and execute the one or more commands from the secure cloud.

Figure 3A:
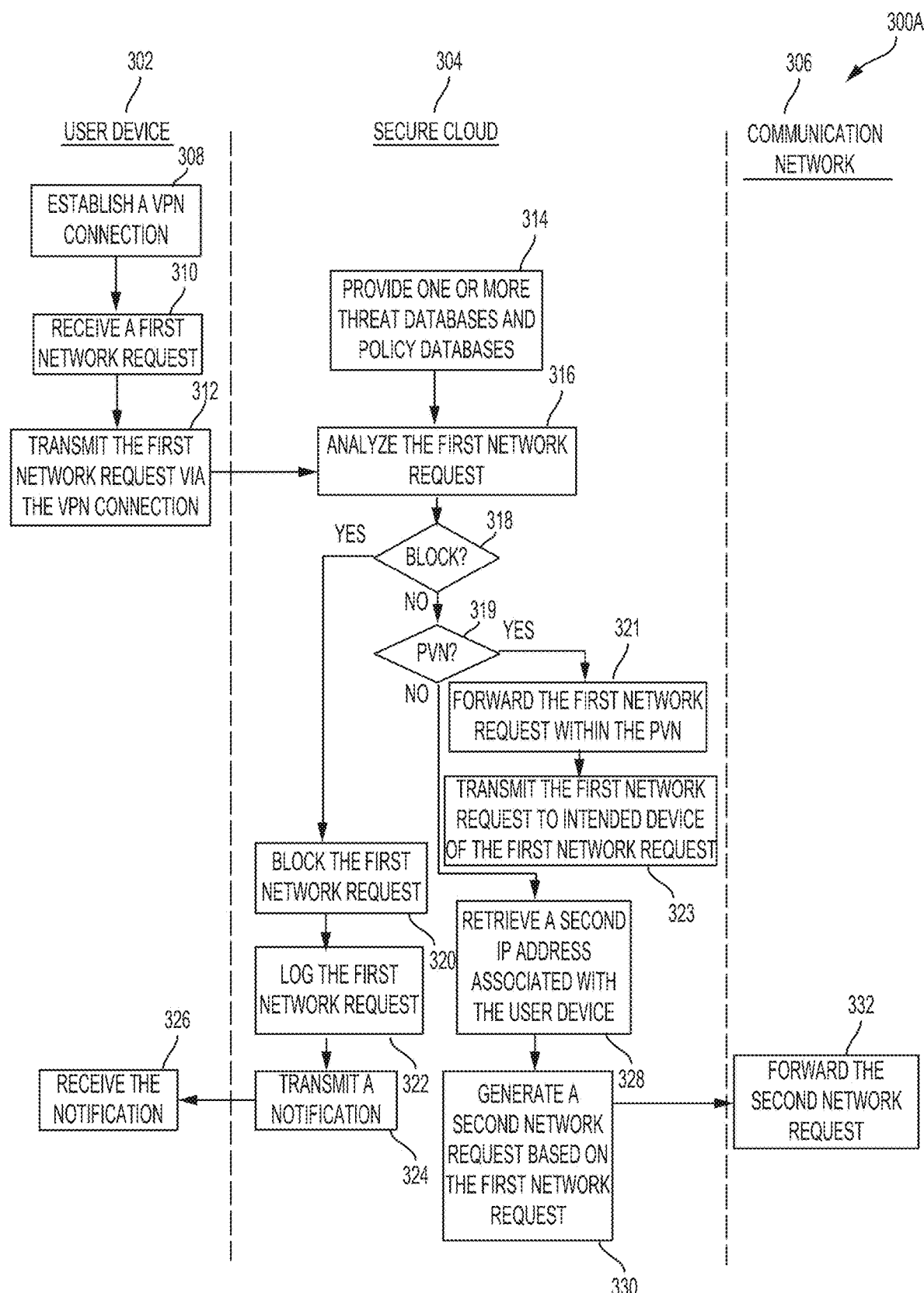
FIG. 3A illustrates a method for operating a cloud-based multi-function firewall to filter network traffic from a user device, according to some embodiments.

FIG. 3A illustrates a method 300A for operating a cloud-based multi-function firewall to filter network traffic originating from a user device, according to some embodiments. In some embodiments, a secure cloud 304 provides a cloud-based multi-function firewall to user device 302 to protect user device 302 from threats in an insecure network 306 and threats on an internal network (e.g., local network 104) on which user device 302 may be connected. In some embodiments, method 300A may be performed by various components of system 100 as described with respect to FIG. 1. For example, user device 302, secure cloud 304, and insecure network 306 may correspond to user device 102, secure cloud 110, and communication network 106, respectively, as shown in FIG. 1. For ease of explanation, steps of method 300A may be described below with reference to other components of system 100 as shown in FIG. 1.

In step 308, user device 302 (e.g., connection component 144) establishes a VPN connection to secure cloud 304 for routing network requests to secure cloud 304. In some embodiments, by routing network requests to the secure cloud 304, user device 302 can access the cloud-based multi-function firewall implemented in secure cloud 304. In some embodiments, a security client running on user device 302 may establish the VPN connection according to method 200 as described with respect to FIG. 2. In some embodiments, the security client can establish the VPN connection between user device 302 and a first cloud server selected from cloud servers in secure cloud 304.

In step 310, user device 302 (e.g., connection component 144) receives a first network request. In some embodiments, the first network request can be an external network request to access a server in insecure network 306 external to the internal network of user device 302. For example, the server may be web server 122, mail server 124, or application server 126 as described with respect to FIG. 1. In some embodiments, the first network request can include a DNS request or an IP address. In some embodiments, the first network request can be an internal network request to communicate with another device coupled to the same internal network as user device 302. For example, as described with respect to FIG. 1, user device 302 may be user device 102A and the first network request may be addressed to another user device 102B, a file server 109, or IoT devices 103 on local network 104.

In some embodiments, the first network request can be input by a user operating user device 302. In some embodiments, the first network request can include data to be transferred to the server in insecure network 306 or to another device in the internal network associated with user device 302.

In step 312, user device 302 (e.g., connection component 144) transmits the first network request to cloud server 304 via the VPN connection. In some embodiments, as described with respect to FIG. 2, user device 302 may transmit the first network request to a domain name or an IP address identifying the first cloud server in cloud server 304. In some embodiments, in contrast to typical routing functionality, user device 302 forwards any network requests generated on user device 302 to the first cloud server independent of the domain name or IP address included in the network request. As will be described below, this automatic forwarding may enable user device 302 to take advantage of the network-security functions provided by the cloud-based multi-function firewall implemented on the first cloud server in secure cloud 304.

In step 314, secure cloud 304 provides, to the first cloud server, one or more threat databases and one or more policy databases. The one or more policy databases can store a global policy (e.g., global policy 134) and an individual policy (e.g., individual policy 136) associated with user device 202 or a user account of user device 202. In some embodiments, the cloud-based multi-function firewall of the first cloud server can be configured to use the global policy and the individual policy in conjunction with threat information in the one or more threat databases to identify actual and potential threats in network traffic, as will be further described with respect to FIGS. 5A-B. In some embodiments, the cloud-based multi-function firewall of the first cloud server can be configured to use the global policy or the individual policy to enforce user-configurable security policies on network traffic. In some embodiments, each cloud server in secure cloud 304, including the first cloud server, maintains a local copy of the global policy (e.g., global policy 134) maintained by an API server (e.g., API server 130) and a local copy of threat information (e.g., information in threat database 137) maintained by the API server.

In step 316, the first cloud server analyzes the first network request received from user device 302. In some embodiments, the cloud-based multi-function firewall (e.g., cloud-based multi-function firewall 114A) implemented by the first cloud server performs the analysis based on the global policy, the individual policy, and the one or more threat databases to apply network-security functions to the first network request. For example, the first cloud server may determine whether the first network request is associated with an actual, known threat, whether the first network request is associated with a potential threat, whether a security policy indicates that that the first network traffic is allowed, or a combination thereof. In some embodiments, the cloud-based multi-function firewall can be configured to determine whether to block the first network request based on a result of the analysis, as will be further described with respect to FIGS. 5A-B. In step 318, if the first cloud server determines to block the first network request, method 300A proceeds to step 320. Otherwise, method 300A proceeds to step 319.

In step 319, the first cloud server determines whether the first network request is associated with a private VN. In some embodiments, the first cloud server can determine if both user device 302 and the intended device of the first network request are associated with the same private VN. For example, the first cloud server may retrieve respective private VN IDs (if any) of each of user device 302 and the intended device to determine if the first network request corresponds to an internal network request. If the private VN is not identified, method 300A proceeds to step 328 in which case the first network request can be processed as an external network request. Otherwise, method 300A proceeds to step 321.

In step 321, the first cloud server forwards the first network request within the private VN managed in secure cloud 304. In some embodiments, a PVN manager (e.g., PVN manager 115A) of the first cloud server can be configured to route the first network request through a virtual interface previously configured on the first cloud server for user device 302, as described above with respect to FIG. 2. In some embodiments, by routing the first network request through the virtual interface, the first network request can be routed among a plurality of virtual interfaces managed by cloud servers and VPN nodes in secure cloud 110 to route the first network request to the intended device.

In step 323, secure cloud 304 transmits the first network request to the intended device indicated in the first network request. In some embodiments, the first network request can be routed among servers (e.g., cloud server 112A-D or VPN nodes 150A-B) having virtual interfaces sharing the same private VN ID associated with user device 302 until a receiving server that manages a virtual interfaces associated with the intended device receives the first network request. Then, the receiving server can be configured to transmit the received first network request to the intended device in communication with the receiving server. In some embodiments, the intended device may be another user device (e.g., user devices 102A-B) or a networked device (e.g., IoT device 103).

In step 320, the cloud-based multi-function firewall in first cloud server blocks the first network request from being transmitted. In step 322, the first cloud server logs the first network request and the analysis information. In some embodiments, the logged information may be transmitted to a policy engine (e.g., policy engine 132) to confirm a validity of the threat identified in the first network request. In step 324, the cloud-based multi-function firewall transmits a notification to a user account associated with user device 302. The notification may include information indicating that the first network request is blocked and associated information related to why the first network request is blocked. In some embodiments, the notification can be transmitted to user device 302. In step 326, user device 302 receives the notification generated by the first cloud server in secure cloud 304.

In step 328, the first cloud server retrieves a second IP address associated with user device 302. In some embodiments, the second IP address is different from a first IP address identifying user device 302. In some embodiments, the second IP address can be used by the first cloud server to mask the real, first IP address of user device 302. In some embodiments, the first cloud server retrieves the second IP address by translating the first IP address of user device 302 to the second IP address using one or more IP translation tables.

In step 330, the first cloud server generates a second network request based on the first network request to allow user device 302 to access requested data from insecure network 306. In some embodiments, the first cloud server can transmit the second network request based on DNS or IP address information specified in the first network request. In some embodiments, the first cloud server can generate the second network request by replacing the first IP address in the first network request with the second IP address to maintain anonymity of user device 302 to increase security. In step 332, insecure network 306 forwards the second network request to the appropriate entity. For example, insecure network 306 may forward the second network request to a server identified by a domain name or an IP address in the second network request.

Figure 3B:
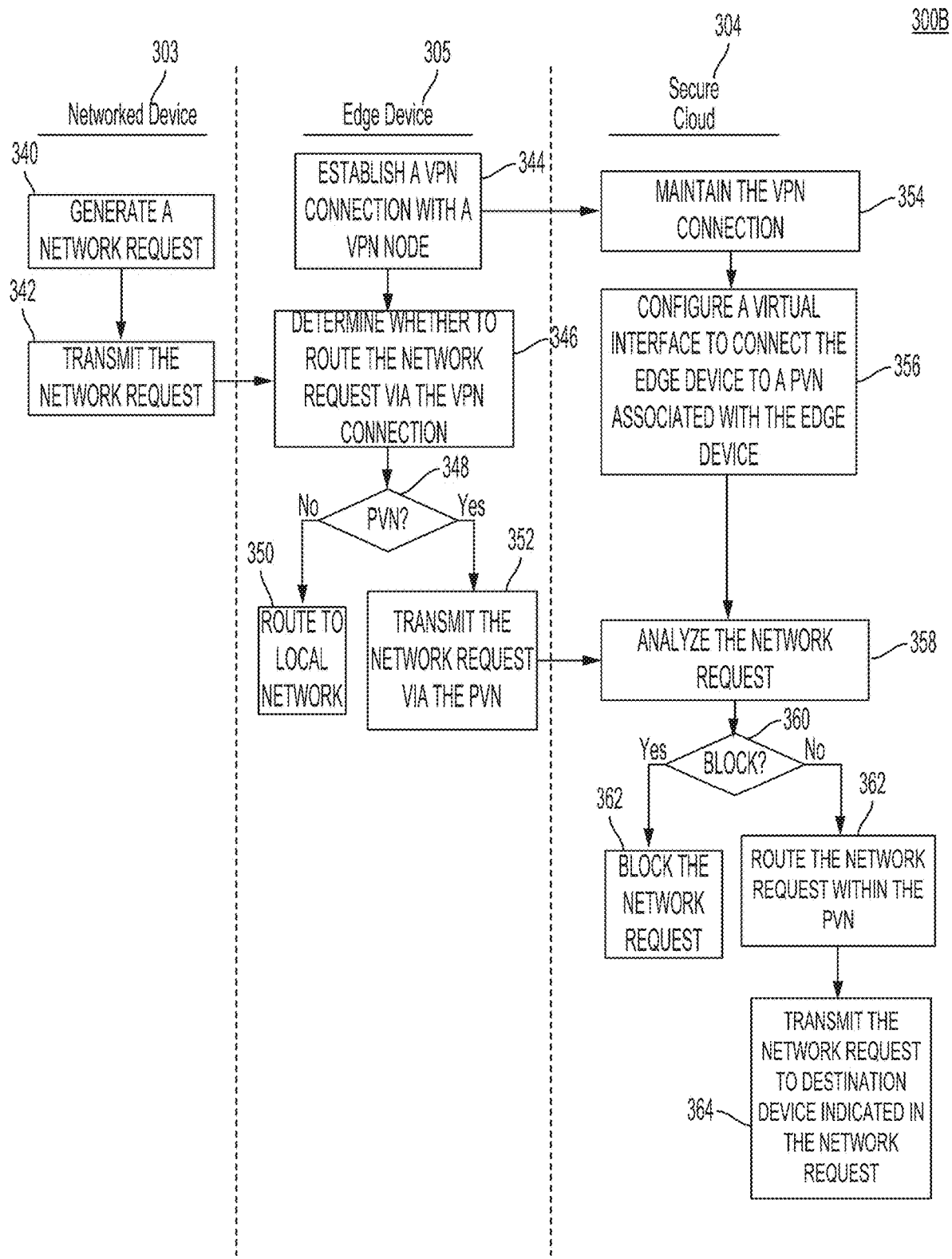
FIG. 3B illustrates a method for operating a cloud-based multi-function firewall to filter network traffic from a networked device on an internal network, according to some embodiments.

FIG. 3B illustrates a method 300B for operating a cloud-based multi-function firewall to filter network traffic from a networked device on an internal network, according to some embodiments. In some embodiments, secure cloud 304 provides a cloud-based multi-function firewall to a networked device 303 to secure network communications between networked device 303 and other devices on the same internal network, such as user devices 102A-B coupled to the same local network as IoT device 103. In some embodiments, method 300B may be performed by various components of system 100 as described with respect to FIG. 1. For example, networked device 303, edge device 305, and secure cloud 304 may correspond to a networked device such as IoT device 103, edge device 105, and secure cloud 110, respectively, as shown in FIG. 1. For ease of explanation, steps of method 300B may be described below with reference to other components of system 100 as shown in FIG. 1.

As described above, the networked device may refer to an electronic device with limited processing capability or memory capacity that prohibits the networked device from installing a security client (e.g., security client 140A) to connect to a secure cloud (e.g., secure cloud 110) providing the cloud-based multi-function firewall. For example, such a networked device may include IoT device 103 such as smart outlets or smart light switches, etc.

In step 340, networked device 303 generates a network request associated with a device on the same internal network as networked device 303. For example, networked device 303 may be IoT device 103 configured to generate sensor readings for transmitting on the internal network. In some embodiments, the network request can include an identifier associated with the internal network shared by networked device 303 and the device. For example, such an identifier may be a private VN ID identifying a private VN corresponding to the internal network, an IP address associated with the private VN, etc.

In step 342, networked device 303 transmits the network request. In some embodiments, the network request is transmitted to edge device 305 configured to provision the internal network.

In step 344, edge device 305 establishes a VPN connection with a VPN node on secure cloud 304. In some embodiments, edge device 304 can be configured to establish the VPN connection based on routing configurations (e.g., routing configuration 111) stored at edge device 305, as described above with respect to FIG. 1. As will be further described below, network traffic originating from networked device 303 may be routed through the VPN connection to be analyzed and processed by the cloud-based multi-function firewall implemented at the VPN node.

In step 354, similar to step 224, the VPN node in secure cloud 304 maintains the VPN connection.

In step 356, similar to step 234, the VPN node configures a virtual interface to connect edge device 305 to a private VN associated with edge device 305. As described above, with respect to FIG. 1, the VPN node server can receive, from an API server, individual policy (e.g., individual policy 136) associated with edge device 305 or a user account of edge device 305 to configure a cloud-based multi-function firewall at the VPN node to perform user-configurable network-security functions. In some embodiments, the individual policy may indicate that edge device 305 is associated with a private VN ID identifying the private VN.

In some embodiments, the virtual interface may be assigned an interface ID to associate with the private VN ID to link the virtual interface with the private VN. As discussed above, by configuring this virtual interface, the servers within secure cloud 204 (e.g., including cloud servers and VPN nodes), can be configured to route network traffic within the same private VNs by routing network traffic among virtual interfaces to configure a private VN to correspond to the internal or local network (e.g., local network 104) associated with networked device 303.

In step 346, edge device 305 determines whether to route the network request of step 342 through the VPN connection established in step 344 based on routing configurations stored at edge device 305. As discussed above, an individual policy associated with edge device 305 may indicate that network traffic having certain criteria be routed through the internal network rather than being routed through secure cloud 304. For example, the criteria may include an ID associated with a device on the same internal network as networked device 303, as described above with respect to step 340. In step 348, if the VPN connection is to be used, method 300B proceeds to step 352. Otherwise, method 300B proceeds to step 350.

In step 350, edge device 305 routes the network request to the internal network. As discussed above, the internal network can route the network request to the device indicated in the network request. In some embodiments, routing network traffic on the internal traffic itself may increase the risk that a compromised device on the internal network may contaminate network security of other devices connected to the same internal network. In some embodiments, to provide the Zero Trust network within the internal network and to reduce such a risk, a device on the internal network and that implements a security client (e.g., security client 140A) can be configured to block network requests that originates directly from other devices on the internal network.

In step 352, edge device 305 transmits the network request to secure cloud 304 through the VPN connection. In some embodiments, edge device 305 can be configured to transmit the network request to the VPN node configured to establish and maintain the VPN connection.

In step 358, similar to step 316, the VPN node on secure cloud 304 analyzes the network request. In some embodiments, the cloud-based multi-function firewall (e.g., cloud-based multi-function firewall 154A) implemented by the VPN node (e.g., VPN node 150A) performs the analysis based on the global policy, the individual policy, and the one or more threat databases to apply network-security functions to the first network request. For example, the VPN node may determine whether the network request is associated with an actual, known threat, whether the network request is associated with a potential threat, whether a security policy indicates that that the network traffic is allowed, or a combination thereof. In some embodiments, the cloud-based multi-function firewall can be configured to determine whether to block the network request based on a result of the analysis, as will be further described with respect to FIGS. 5A-B. In step 360, if the VPN node determines to block the network request, method 300B proceeds to step 362. Otherwise, method 300B proceeds to step 362.

In step 366, similar to step 320, the cloud-based multi-function firewall in the VPN node blocks the network request from being transmitted. In some embodiments, the VPN node can be configured to log the network request and the analysis information. In some embodiments, the logged information may be transmitted to a policy engine (e.g., policy engine 132) to confirm a validity of the threat identified in the network request. In some embodiments, the cloud-based multi-function firewall can be configured to transmit a notification to a user account associated with networked device 303. The notification may include information indicating that the network request was blocked and associated information related to why the network request was blocked.

In step 362, similar to step 321, the VPN node forwards the network request within the private VN associated with edge device 305 and managed in secure cloud 304. In some embodiments, a PVN manager (e.g., PVN manager 152) of the VPN node can be configured to route the network request through the virtual interface previously configured on the VPN node, as described above with respect to step 356. In some embodiments, by routing the network request through the virtual interface, the network request can be routed among a plurality of virtual interfaces managed by cloud servers and VPN nodes in secure cloud 304 to route the network request to the intended device indicated in the network request.

In step 364, similar to step 323, secure cloud 304 transmits the network request to the intended device indicated in the network request. In some embodiments, the network request can be routed among servers (e.g., cloud server 112A-D or VPN nodes 150A-B) having virtual interfaces sharing the same private VN ID associated with edge device 305 until a receiving server that manages a virtual interfaces associated with the intended device receives the network request. Then, the receiving server can be configured to transmit the received network request to the intended device in communication with the receiving server. In some embodiments, the intended device may be another user device (e.g., user devices 102A-B) or a networked device (e.g., IoT device 103) on the internal network provisioned by edge device 305.

Figure 4:
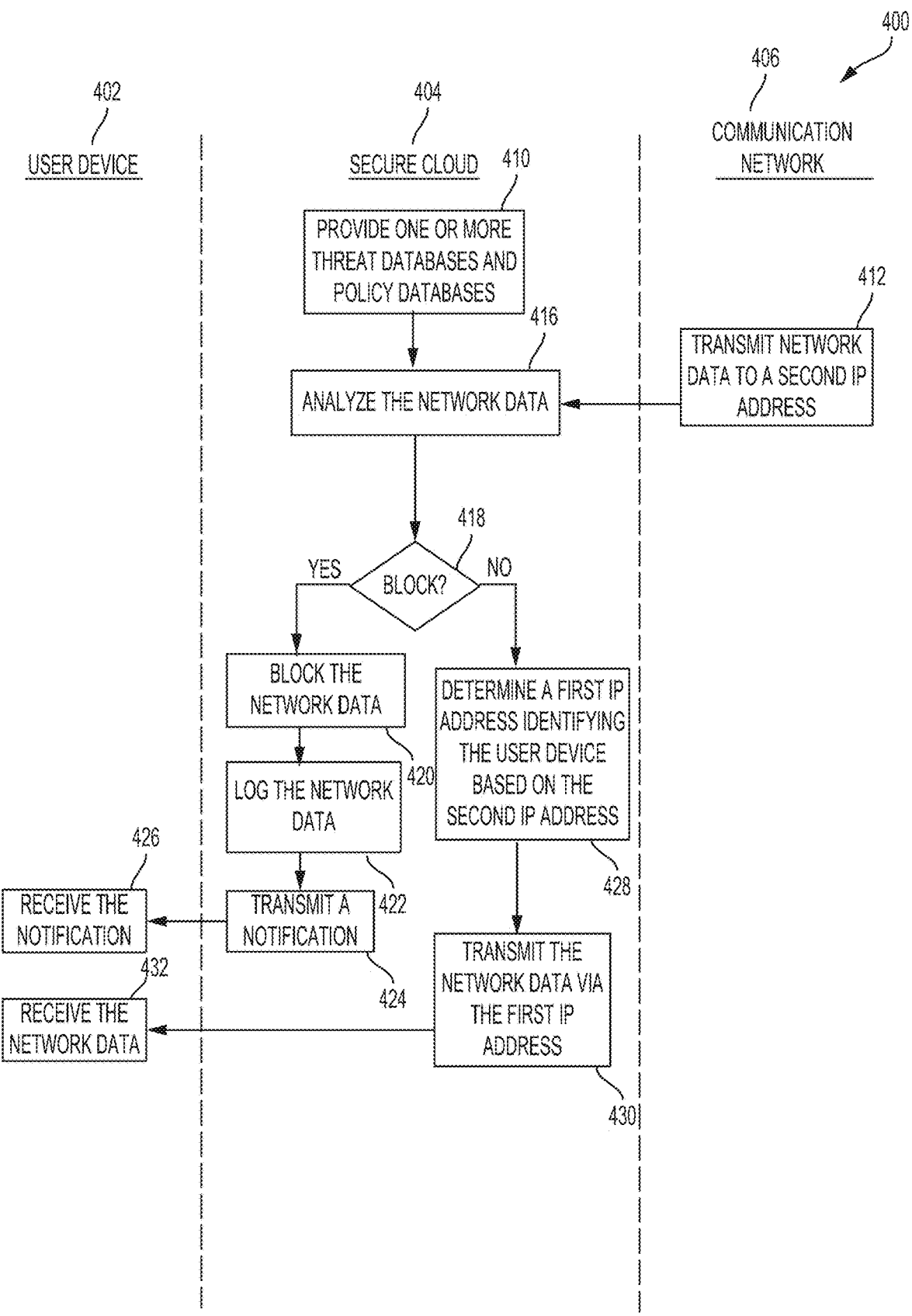
FIG. 4 illustrates a method for operating a cloud-based multi-function firewall to filter network traffic intended for a user device from an external network, according to some embodiments.

FIG. 4 illustrates a method 400 for operating a cloud-based multi-function firewall to filter network traffic intended for a user device from an external network, according to some embodiments. In some embodiments, a secure cloud 404 provides a cloud-based multi-function firewall to user device 402 to protect user device 402 from threats in an insecure network 406 as well as to enforce security policies on network traffic between user device 402 and insecure network 406. In some embodiments, method 400 may be performed by various components of system 100 as described with respect to FIG. 1. For example, user device 402, secure cloud 404, and insecure network 406 may correspond to user device 102A, secure cloud 110, and communication network 106, respectively, as shown in FIG. 1. For ease of explanation, steps of method 400 may be described below with reference to other components of system 100 as shown in FIG. 1 as well as method 300A of FIG. 3A. In some embodiments, as described with respect to FIGS. 2 and 3A, user device 402 can establish a secure VPN connection with a first cloud server in secure cloud 404 to access the network-security functions provided by a cloud-based multi-function firewall in the first cloud server.

In step 410, similar to step 314, secure cloud 404 provides, to first cloud server, one or more threat databases and one or more policy databases. The one or more policy databases can store a global policy (e.g., global policy 134) and an individual policy (e.g., individual policy 136) associated with user device 202. In some embodiments, the cloud-based multi-function firewall of the first cloud server can be configured to use the global policy and the individual policy in conjunction with threat information in the one or more threat databases to provide network-security functions such as to enforce security polices or to identify actual and potential threats in network traffic, as will be further described with respect to FIGS. 5A-B. In some embodiments, each cloud server in secure cloud 304, including the first cloud server, maintains a local copy of the global policy (e.g., global policy 134) maintained by an API server (e.g., API server 130) and a local copy of threat information (e.g., information in threat database 137) maintained by the API server.

In step 412, network data can be transmitted from communication network 406, i.e., an insecure network, to a second IP address associated with secure cloud 404. In some embodiments, the network data can be generated by a server such as one of data sources 120 in FIG. 1. In some embodiments, the network data may be generated in response to a network request previously generated by user device 402 and approved for transmission by secure cloud 404, as described with respect to FIG. 3A. In some embodiments, the second IP address can be an IP address used to mask a first IP address of the user device 402.

In step 416, similar to step 316, a cloud-based multi-function firewall on the first cloud server analyzes the network data received from communication network 406. In some embodiments, a first cloud server in secure cloud 404 having the second IP address receives the network data specifying and addressed to the second IP address. In some embodiments, the cloud-based multi-function firewall (e.g., cloud-based multi-function firewall 114A) implemented by the first cloud server performs the analysis based on the global policy, the individual policy, and the one or more threat databases to apply network-security functions to the first network request. For example, the first cloud server may determine whether the network data is associated with an actual, known threat, whether the network data is associated with a potential threat, or whether a security policy indicates that that the first network traffic is allowed, or a combination thereof. In some embodiments, the cloud-based multi-function firewall can be configured to determine whether to block the network data based on a result of the analysis, as will be further described with respect to FIGS. 5A-B. In step 418, like in step 318, if the first cloud server determines to block the network data, method 400 proceeds to step 420. Otherwise, method 400 proceeds to step 428.

In some embodiments, steps 420-426 operate similarly to steps 320-326 as described with respect to FIG. 3A. In particular, in step 420, the cloud-based multi-function firewall blocks the network data from being transmitted to user device 402. In step 422, the cloud-based multi-function firewall logs the network data and analysis information for transmission to a policy engine (e.g., policy engine 132) to confirm a validity of the threat identified in the network data. In step 424, the cloud-based multi-function firewall transmits a notification to a user account associated with user device 402. The notification may include information indicating that the network data is blocked and associated information related to why the network data is blocked. In some embodiments, the notification can be transmitted to user device 302. In step 426, user device 402 receives the notification generated by the first cloud server in secure cloud 404.

In step 428, the first cloud server determines the first IP address identifying user device 402 based on the second IP address. In some embodiments, the first cloud server looks up the second IP address in an IP masking table to determine the first IP address.

In step 430, the first cloud server transmits the network data to user device 402 via the first IP address. In some embodiments, the network data can be transmitted to user device 402 via a VPN connection established between user device 402 and the first cloud server in secure cloud 404. In step 432, user device 402 receives the network data that has been inspected by the cloud-based multi-function firewall to be free of threats.

Figure 10A:
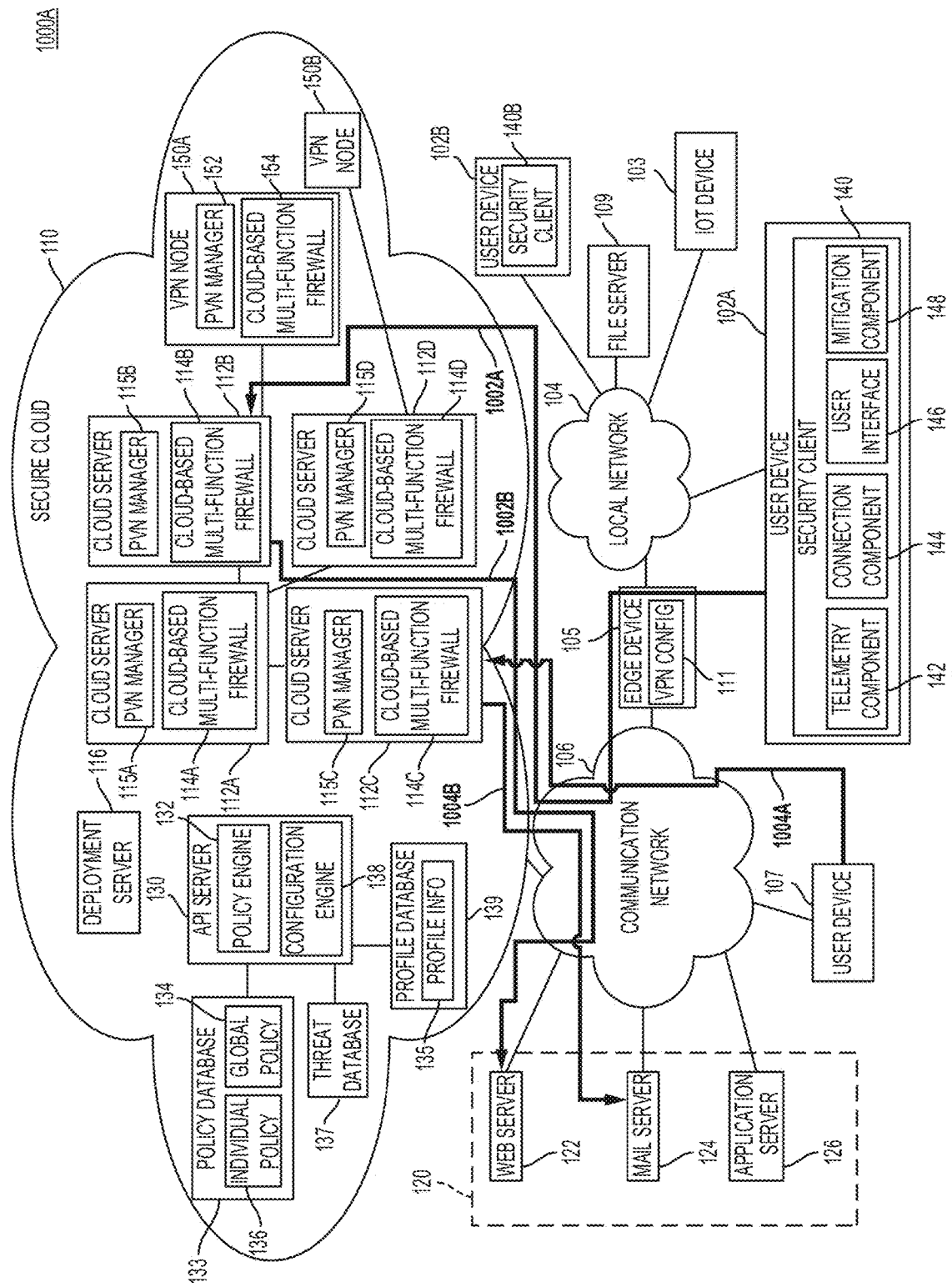
FIGS. 10A-C illustrates diagrams showing example data flows of devices protected by the system providing the cloud-based multi-function firewall, according to some embodiments.
Figure 10B:
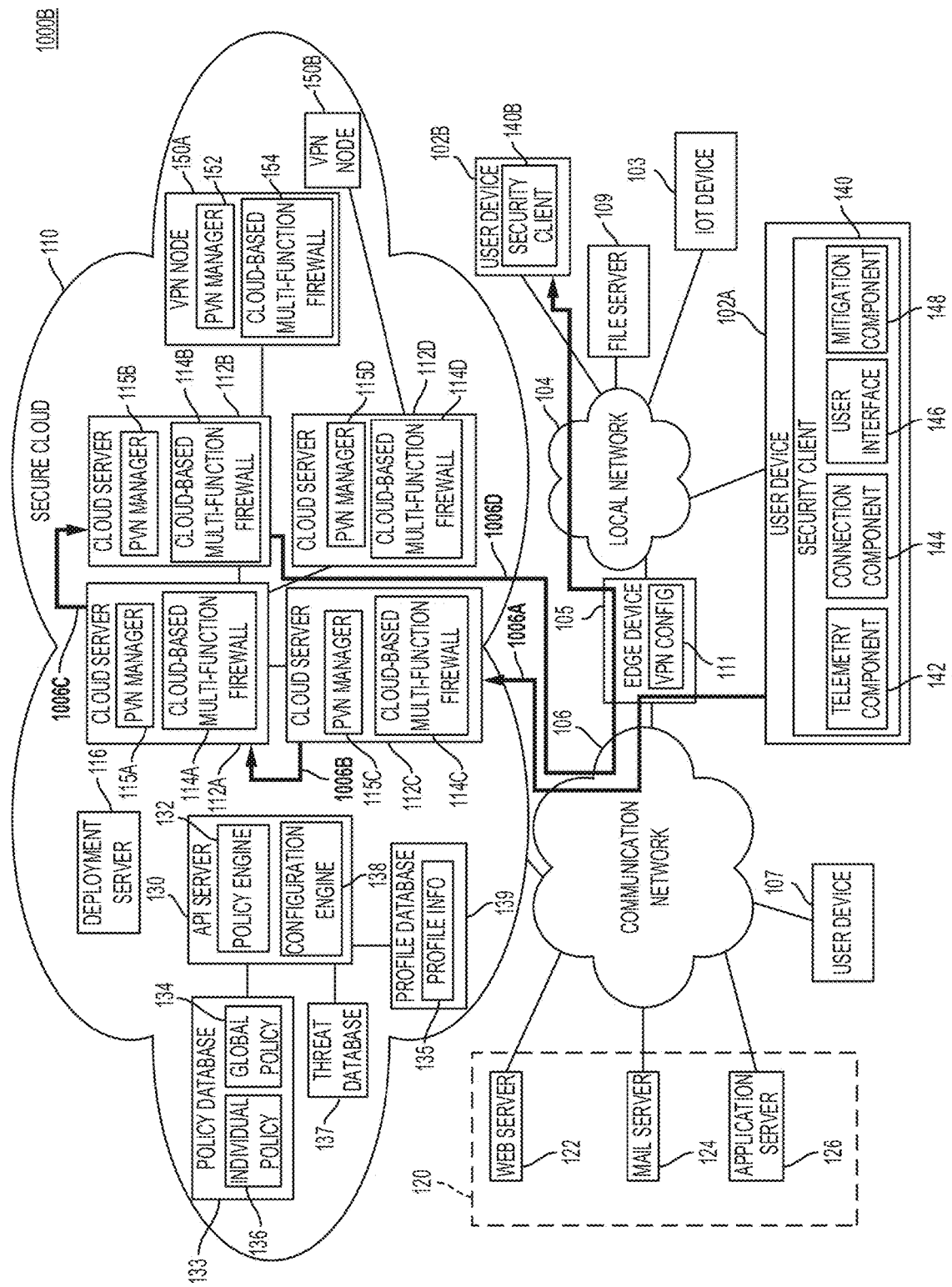
Figure 10C:
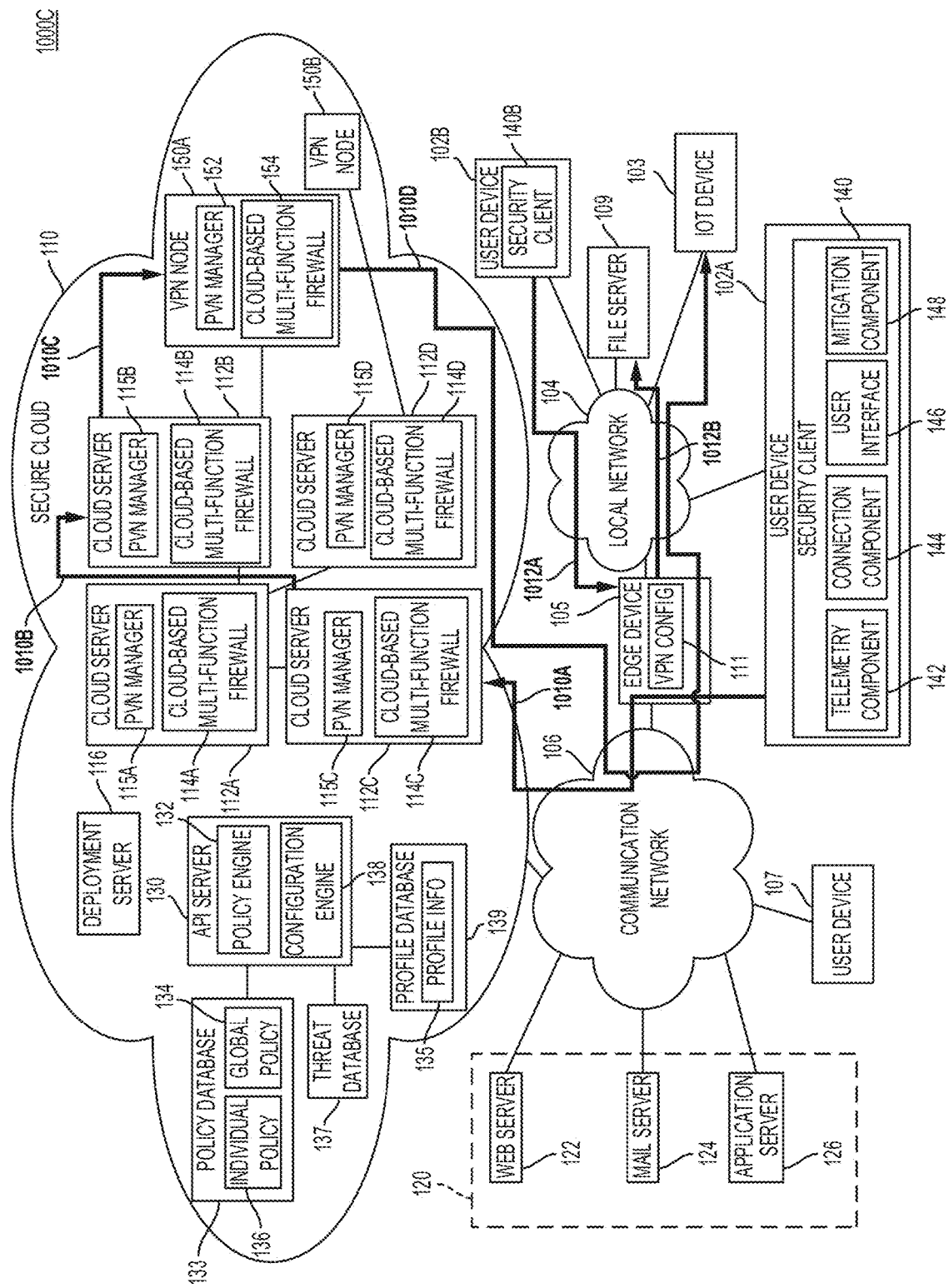

FIGS. 10A-C illustrate diagrams 1000A-C showing example data flows of devices protected by system 100 providing a cloud-based multi-function firewall, according to some embodiments. For ease of illustration, the following descriptions of diagrams 1000A-C may refer to methods 200, 300A, 300B, and 400 of FIGS. 2, 3A, 3B, and 4, respectively.

FIG. 10A shows a diagram 1000A in which user devices such as user devices 102A and 107 are protected by the cloud-based multi-function firewalls of secure cloud 110 when they access a data source 120 on the insecure communication network 106. In some embodiments, upon startup or based on user activation, each of protected user devices 102A and 107 may dynamically connect to secure cloud 110, as described above with respect to FIG. 2. For example, as shown in diagram 1000A, user devices 102A and 107 may be configured to establish respective VPN connections with cloud servers 112B and 112C. The specific cloud server for a user device may be dynamically selected by API server 130 for that user device at the instance in time the user device connects to secure cloud 110, as described above with respect to FIG. 2.

In some embodiments, whenever user devices 102A and 107 protected by secure cloud 110 issue network requests for data sources 120 on insecure, communication network 106, the network requests can be configured to be forcibly routed to the assigned cloud server to enable network-security functions to be applied to the network requests. In some embodiments, the network-security functions include analyzing the network requests for potential or actual security threats as well as to enforce user-configurable security policies, as described above with respect to FIG. 3A. For example, when user device 107 issues a network request to access, for example, mail server 124, the network request can be routed via data flow 1004A to cloud server 112C. At cloud server 112C, cloud-based multi-function firewall 114C can be configured to analyze the network request to detect a potential or actual threat or to determine whether the network request is allowed by a security policy, as described above with respect to FIG. 3A. If the network traffic is allowed, cloud server 112C may continue to route the network traffic to mail server 124 in data flow 1004B. Otherwise, if such a threat is detected or the security policy indicates that the network request is not allowed, cloud server 112C can block the network traffic and data flow 1004B. Similarly, data originating from mail server 124 may be transmitted to cloud server 112C and only forwarded back to user device 107 based on analysis of network traffic of mail server 124 as received at cloud server 112C.

Similarly, when user device 102A issues a network request to a device external to local network 104 such as web server 122, the network request may be routed through the VPN connection previously established between user device 102A and cloud server 112B. This route is shown as data flow 1002A. If the cloud-based multi-function firewall of cloud server 112B permits the network request to be routed, the network request may be transmitted to web server 122 through data flow 1002B.

FIG. 10B shows a diagram 1000B in which user devices such as user devices 102A and 102B are protected by the cloud-based multi-function firewalls of secure cloud 110 when they communicate with each other on the same internal network such as local network 104. As described above with respect to FIG. 1, secure cloud 110 can configure a private VN within secure cloud 110 for replacing local network 104 to implement a Zero Trust network architecture in which network traffic between devices on local network 104 is not automatically allowed. In some embodiments, upon startup or based on user activation, each of protected user devices 102A and 102B may dynamically connect to secure cloud 110, as described above with respect to FIG. 2. For example, as shown in diagram 1000B, user devices 102A and 102B may be configured to establish respective VPN connections with cloud servers 112C and 112B, respectively. The specific cloud server for a user device may be dynamically selected by API server 130 for that user device at the instance in time the user device connects to secure cloud 110, as described above with respect to FIG. 2. In some embodiments, after or during establishment of the VPN connection, the cloud servers can be configured to implement a virtual interface corresponding to the connected user device to connect that user device to a private VN corresponding to local network 104, as described above with respect to FIGS. 1 and 2.

In some embodiments, when user device 102A protected by secure cloud 110 issues network requests to communicate with other devices on local network 104, the network requests can be configured to be forcibly routed to the assigned cloud server to enable network-security functions to be applied to the network request, as described above with respect to FIG. 3A. For example, when user device 102A issues a network request to communicate with, for example, user device 102B, the network request can be routed via data flow 1006A to cloud server 112C. At cloud server 112C, cloud-based multi-function firewall 114C can be configured to analyze the network request to detect a potential or actual threat or to determine whether the network request is allowed by a security policy, as described above with respect to FIG. 3A.

If the network traffic is allowed, cloud server 112C may determine whether the network request is associated with a private VN. In the example shown in diagram 1000B, the intended device of the network request is associated with the same private VN as user device 102A because user devices 102A-B are part of the same internal network (i.e., local network 104). Accordingly, secure cloud 110 can be configured to forward the network request within the private VN maintained at secure cloud 110. For example, the network traffic may be routed from cloud server 112C to cloud server 112A in data flow 1006B, then forwarded to cloud server 112B in data flow 1006C. In some embodiments, network traffic may be routed in the private VN until a receiving cloud server is associated with the intended device indicated in the network request. In the example of diagram 1000B, user device 102B was previously configured to communicate with cloud server 112B and therefore cloud server 112B can be configured to transmit the network request at data flow 1006D through the VPN connection previously established.

FIG. 10C shows a diagram 1000C in which user devices such as user devices 102A and 102B communicate with other networked devices such as file server 109 and IoT devices 103 that are connected to the same internal network such as local network 104. As described above with respect to FIG. 1, secure cloud 110 can configure a private VN within secure cloud 110 for replacing local network 104 to implement a Zero Trust network architecture in which network traffic between devices on local network 104 is not automatically allowed. In some embodiments, upon startup or based on user activation, user device 102A and 102B may dynamically connect to secure cloud 110, as described above with respect to FIG. 2. For example, user devices 102A and 102B may be configured to establish respective VPN connections with cloud servers 112C and 112B, respectively. In some embodiments, edge device 105 can be configured to establish a VPN connection with VPN node 150A on secure cloud 110, as described above with respect to FIG. 3B, to prevent actual or potential security threats from being communicated to and from networked devices coupled to edge device 105.

In some embodiments, after or during establishment of the VPN connection between a device (e.g., user device 102A or edge device 105) and secure cloud (e.g., cloud server 112C or VPN node 150A), the server establishing the VPN connection can be configured to implement a virtual interface corresponding to the connected device to connect that device to a private VN corresponding to local network 104, as described above with respect to FIGS. 1, 2, and 3B.

In some embodiments, when user device 102A protected by secure cloud 110 issues network requests to communicate with other devices on local network 104, the network requests can be configured to be forcibly routed to the assigned cloud server to be analyzed for security threats as well as to enforce user-configurable security policies, as described above with respect to FIG. 3A. For example, when user device 102A issues a network request to communicate with, for example, a networked device such as IoT devices 103, the network request can be routed via data flow 1010A to cloud server 112C. At cloud server 112C, cloud-based multi-function firewall 114C can be configured to analyze the network request to detect a potential or actual threat or to determine whether the network request is allowed by a security policy, as described above with respect to FIG. 3A.

If the network traffic is allowed, cloud server 112C may determine whether the network request is associated with a private VN. In the example shown in diagram 1000C, the intended device of the network request (e.g., IoT device 103) is associated with the same private VN as user device 102A because user device 102A and IoT device 103 are part of the same internal network (i.e., local network 104). Accordingly, secure cloud 110 can be configured to forward the network request within the private VN maintained at secure cloud 110. For example, the network traffic may be routed from cloud server 112C to cloud server 112B in data flow 1010B, then forwarded to VPN node 150A in data flow 1010C. In some embodiments, network traffic may be routed in the private VN until a receiving server is associated with the intended device indicated in the network request. In the example of diagram 1000C, edge device 105 was previously configured to communicate with VPN node 150A to secure network communications between networked devices on local network 104 and other devices on local network 104. Therefore, VPN node 150A can be configured to transmit the network request at data flow 1010D through the VPN connection previously established between edge device 105 and VPN node 150A.

In some embodiments, network requests originating from a networked device such as IoT device 103 and intended for another device on the same internal network such as user device 102A can be routed in the reverse order. For example, the network traffic can be routed from IoT device 103 to VPN node 150A where the network traffic can be routed through the private VN maintained at secure cloud 110 until cloud server 112C receives the network request. Upon receiving the network request, cloud server 112C can determined that it manages a virtual interface that connects the intended device, user device 102, with the private VN. Upon making this determination, cloud server 112C can be configured to transmit the received network request to user device 102A through the previously-established VPN connection.

In some embodiments, certain types of network requests between two devices on local network 104 may not need to be forcibly routed through the private VN maintained at secure cloud 110, as described above with respect to FIG. 3B. In some embodiments, the types of network requests may be user configurable. For example, user device 102B may generate a network request to access large data files stored on file server 109. The network request may be issued to edge device 105 in data flow 1012A. In some embodiments, based on specific user configurations, edge device 105 may allow the network request to be directly issued to file server 109 in data flow 1012B. For example, this functionality may be useful when the user is downloading, from file server 109, large files that the user previously saved to file server 109 and that the user knows does not contain a security threat.

Figure 5A:
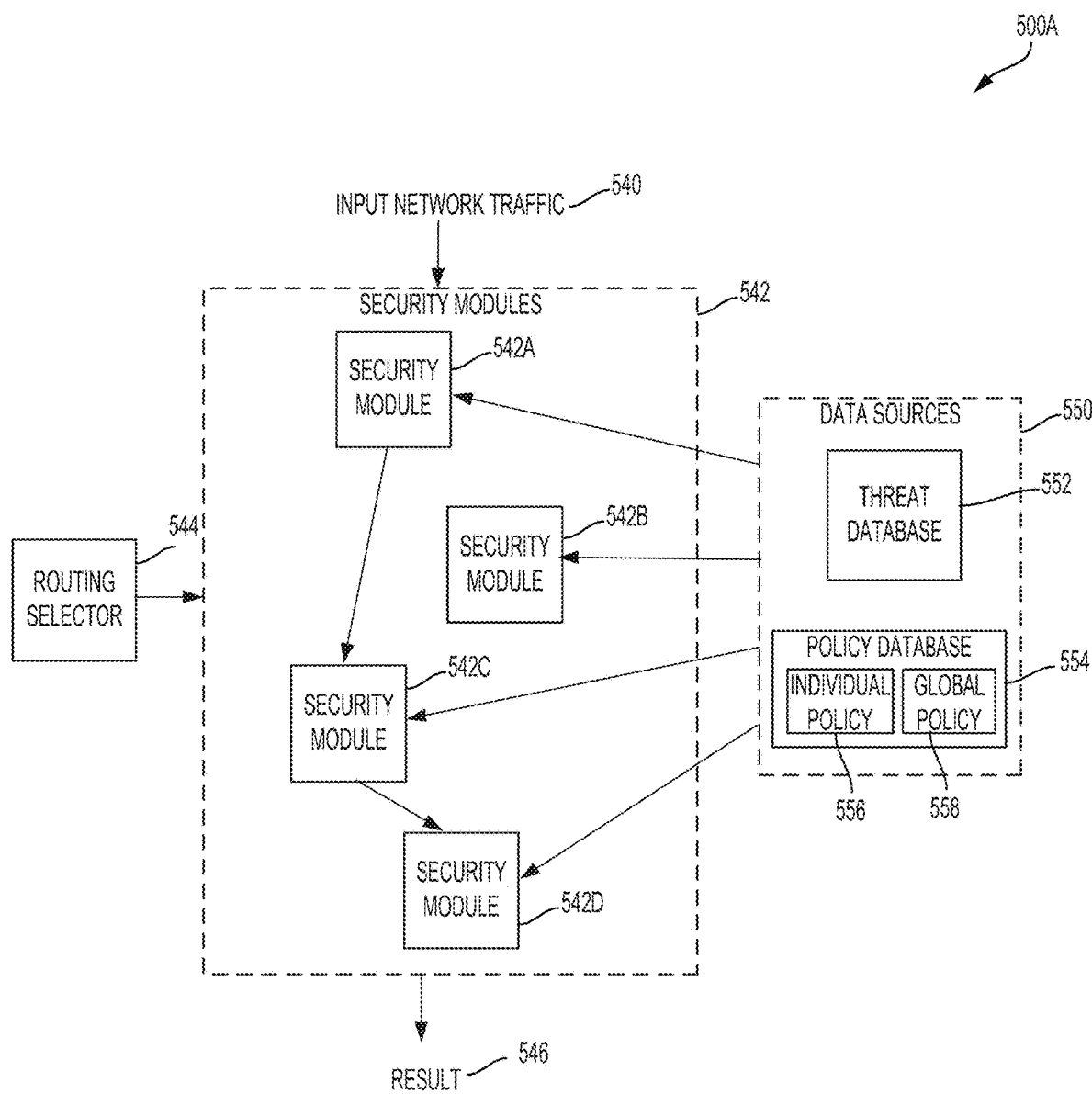
FIG. 5A illustrates a diagram showing how a cloud-based multi-function firewall processes network traffic, according to some embodiments.

FIG. 5A illustrates a diagram 500A showing how a cloud-based multi-function firewall, implemented by a server, processes network traffic, according to some embodiments. For example, the cloud-based multi-function firewall may be any of cloud-based multi-function firewalls 114A-D in respective cloud servers 112A-D or cloud-based multi-function firewalls 154A-B in VPN nodes 150A-B, as described with respect to FIG. 1. In some embodiments, the server can include or access various data sources 550 such as threat database 552 and policy database 554. In some embodiments, policy database 554 includes global policy 558 and individual policy 556. Global policy 558 at the server may be a copy of global policy (e.g., global policy 134) managed by an API server. Individual policy 556 may include policies (e.g., individual policy 136) retrieved from an API server and that are specific to one or more user devices connected to the server. In some embodiments where the cloud-based multi-function firewall is implemented within the VPN node, individual policy 556 may include policies that are specific to an edge device (e.g., edge device 105) coupled to a plurality of IoT devices (e.g., IoT device 103) on the internal network (e.g., local network 104) provided by the edge device. In some embodiments, threat database 552 at the server (e.g., the cloud server or the VPN node) may be a copy of a threat database (e.g., threat database 137) managed by the API server.

In some embodiments, input network traffic 540 can include network requests originating from a first device coupled to the internal network (e.g., local network 104). For example, the first device coupled to the internal network may include user devices 102A-B, IoT devices 103, a file server 109, etc. In some embodiments, the network request may be directed to a device external to the internal network such as web server 122, mail server 124, application server 126, or user device 107 on communication network 106. In some embodiments, the network request may be directed to a second device on the internal network such as other user devices 102A-B, file server 109, IoT devices 103, etc. By forwarding network requests, including communications between the first and second devices on the internal network, to be processed by the cloud-based multi-function firewall, a zero trust environment can be maintained at the internal network. If any security threats or policy violations are detected, the network request may be halted and the security threat may be prevented from spreading among other devices in the internal network.

In some embodiments, diagram 500A may be applicable to other types of inputs in addition to input network traffic 540 associated with a user device. For example, an input may be profile information (e.g., profile information 135) associated with the user device. Accordingly, the cloud-based multi-function firewall can not only monitor and filter real-time network traffic, but also the cloud-based multi-function firewall can analyze device data from the user device to determine whether the user device was previously exposed to a threat.

In some embodiments, the cloud-based multi-function firewall can be configured to route input network traffic among a plurality of security modules 542 to detect different types of attributes in the network traffic that may indicate an actual or potential threat. For example, security modules 542 may include one or more of security modules 542A-D, which may correspond to a DNS analyzer, an intrusion protection system (IPS), a data file analyzer, a network protocol filter, among other types of applications. In some embodiments, a security module can be associated with encryption protocols. In these embodiments, the security module can be configured to decrypt network traffic before allowing one or more other security modules to analyze the decrypted network traffic. For example, this security module may be capable of decrypting SSL/TLS encrypted network traffic. In some embodiments, each of the security routing modules 542A-D can access threat database 552, global policy 558, and individual policy 556 stored at the cloud server to analyze one or more attributes of input network traffic 540. In some embodiments, as described above with respect to FIG. 1, the cloud server can manage and maintain one or more individual policies 556 associated with user devices that are connected to the cloud server via respective VPN connections. Similarly, a VPN node can also manage and maintain one or more individual policies 556 associated with edge devices that are connected to the cloud server via respective VPN connections between edge devices and the VPN node.

In some embodiment, the cloud-based multi-function firewall can include routing selector 544 for routing input network traffic 540 between various security modules 542. In some embodiment, routing selector 544 may select a specific routing path based on a default setting, global policy 558 that applies to all user devices, or individual policy 556 that applies to a specific user device or edge device. For example, input network traffic 540 may be associated with a user device, e.g., user device 102A as described with respect to FIG. 1. Based on global policy 558 and individual policy 556 associated with the user device, routing selector 544 may select the example routing path shown: security module 542A, security module 542C, and security module 542D to process input network traffic 540. A result 546 generated by one or more of security modules 542A-D can be used by the cloud-based multi-function firewall to determine how to respond to input network traffic 540. For example, the cloud-based multi-function firewall may block, permit, flag, or log input network traffic 540.

As discussed above, the internal network may be replicated as a private virtual network on the secure cloud such that network traffic on the internal network (e.g., local network 104) is routed instead through the secure cloud. Accordingly, when input network traffic 540 is between two devices (e.g., the first and second devices discussed above) on the internal network, result 546 may be to continue to route input network traffic 540 to one or more other servers (e.g., a cloud server or a VPN node) in the private virtual network until a server receiving the input network traffic 540 can route the network traffic to the intended device.

Figure 5B:
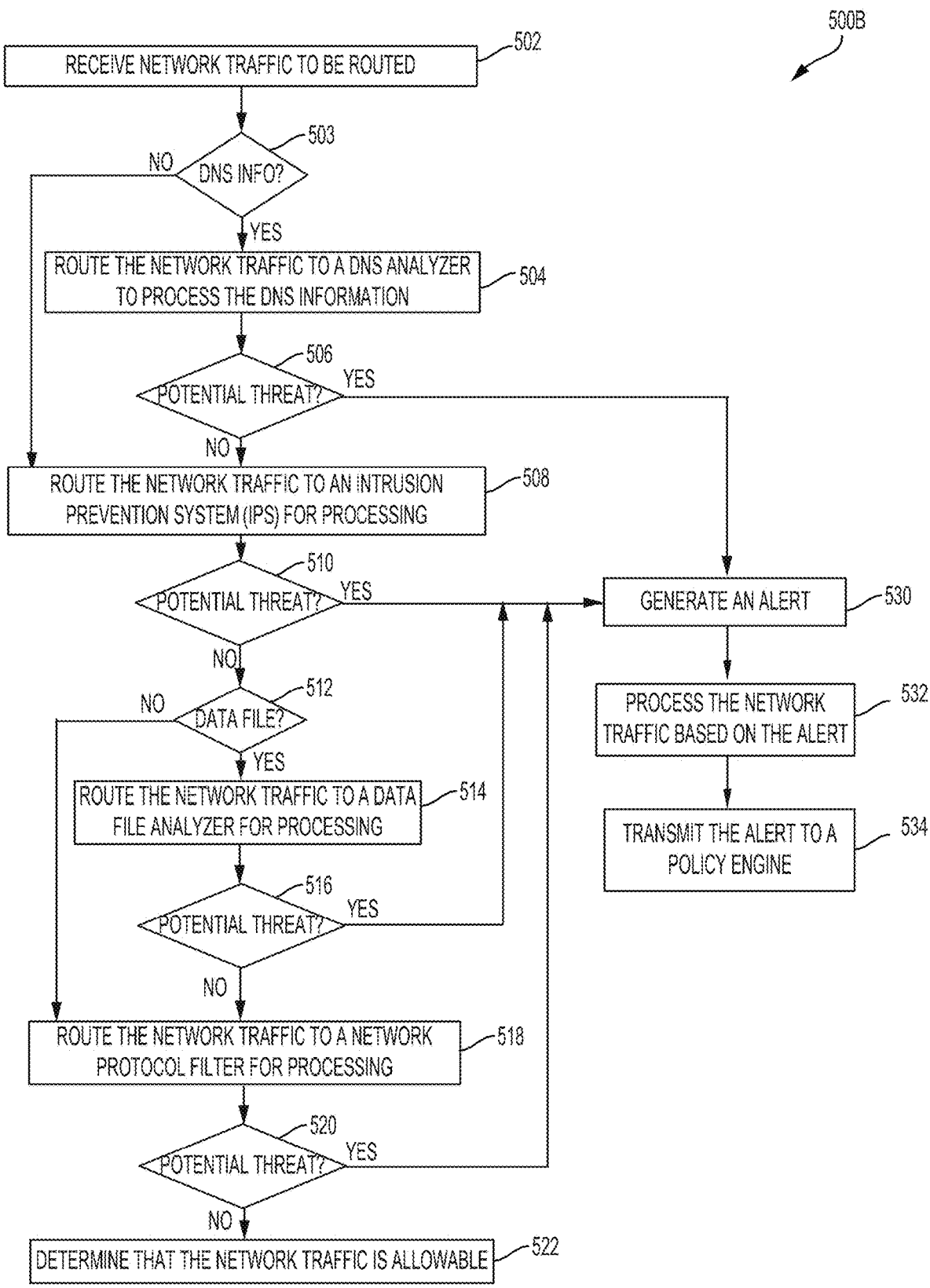
FIG. 5B illustrates a method performed by a cloud-based multi-function firewall to process network traffic, according to some embodiments.

FIG. 5B illustrates a method 500B performed by a cloud-based multi-function firewall on a server (e.g., a cloud server or a VPN node) to process network traffic, according to some embodiments. In some embodiments, method 500B may be performed by one of cloud-based multi-function firewalls 114A-D or 154A-B as described with respect to FIG. 1 for routing network traffic between an insecure communication network, e.g., the Internet, and a user device such as user device 102A or between the devices on an internal network, such as local network 104. In some embodiments, all network traffic between the user device and any external network can be examined by and routed through the cloud-based multi-function firewall, as described in diagram 500A. In some embodiments, network traffic between devices on the internal network can also be examined by and routed through the cloud-based multi-function firewall. In some embodiments, method 500B may correspond to step 316 of FIG. 3A, step 358 of FIG. 3B, and step 416 of FIG. 4 in which network traffic (i.e., network request or network data) is analyzed by the cloud-based multi-function firewall to determine whether to generate an alert and whether to block the network traffic based on the generated alert. In some embodiments, method 500B may correspond to a specific routing path between security modules selected to process network traffic associated with a specific device originating the network traffic, as described with respect to diagram 500A of FIG. 5A. Accordingly, the steps of method 500B may not necessarily be performed in the outlined order and may depend on user configurations, global configurations, etc. For example, step 508 associated with a type of threat attribute may be performed before step 504 associated with a different type of threat attribute.

In some embodiments, one or more steps of method 500B related to detecting potential or actual threats in network traffic can be similarly applied to profile information (e.g., profile information 135) associated with a user device. For example, instead of receiving network traffic in step 502 to be routed to one or more security modules, one or more portions of the profile information associated with the user device can be routed to the one or more security modules to determine whether the user device associated with the profile information has been previously exposed to an actual or potential threat.

In step 502, the cloud-based multi-function firewall (e.g., cloud-based multi-function firewall 114A) receives network traffic to be routed. In some embodiments, the network traffic received at the cloud-based multi-function firewall can be a network request received from and generated by a user device (e.g., user device 102A). The network request can be intended for transmission to an insecure network (e.g., communication network 106). For example, the network request may be a DNS request. In some embodiments, the network request can be addressed to a device or resource on an internal network (e.g., local network 104) with respect to the user device. In some embodiments, the network traffic can be network data transmitted, via the insecure network, by a data source (e.g., data source 120) and intended for the user device. In some embodiments, the network traffic can include network data generated on the internal network (e.g., generated by another use device 102B, file server 109, IoT devices 103, etc.) and intended for user device 102A.

In step 503, cloud-based multi-function firewall determines whether the network traffic includes DNS information. If the DNS information is detected, method 500B proceeds to step 504. Otherwise, method 500B proceeds to step 508. For example, if the network traffic is network data intended for the user device, the network traffic may include an IP address associated with the user device and no DNS information (e.g., Internet domains or host names). In this example, DNS information may not be detected and method 500B proceeds to step 508. In another example, the network traffic may be a network request generated by the user device to access an Internet domain, e.g., "www.google.com." In this example, DNS information can be detected and method 500B proceeds to step 504.

In step 504, the cloud-based multi-function firewall routes the network traffic to a DNS analyzer configured to process the DNS information detected in the network traffic. In some embodiments, the DNS analyzer can be configured to analyze the DNS information to determine whether an actual or potential threat exists. In some embodiment, to perform the determination, the DNS analyzer can be configured to check whether a domain name in the DNS information is associated with a threat. In some embodiments, to analyze the domain name, the DNS analyzer can be configured to communicate with a DNS server to obtain an IP address that corresponds to the domain name. Then, the DNS analyzer can be configured to determine whether the domain or the associated IP address is associated with a known threat, e.g., a botnet address or a malicious IP address. In step 506, if an actual or potential threat is detected, method 500B proceeds to step 530. Otherwise, method 500B proceeds to step 508.

In step 508, the cloud-based multi-function firewall routes the network traffic to an intrusion prevention system (IPS) for processing. For example, as shown in method 500B, the network traffic may be routed from the DNS analyzer described in step 504 to the IPS. In some embodiments, the IPS can be signature based, anomaly based, or both signature and anomaly based. To perform threat detection using a signature-based technique, the IPS can be configured to analyze the network traffic to identify specific data patterns (e.g., byte sequences or malicious instruction sequences) that are associated with known threats including, for example, malware, vulnerabilities, botnet calls, exploits, etc. In some embodiments, the specific data patterns may include a sequence of bytes that corresponds to an IP address.

To perform threat detection using an anomaly-based technique, the IPS can be configured classify the network traffic as including a potential threat based on heuristics or rules. In some embodiments, the IPS implement one or more machine learning algorithms (e.g., neural networks, learning classifier systems, association rule learning, artificial immune systems, etc.), strict mathematical models, data mining methods, or a combination thereof to detect anomalous attributes associated with the network traffic. The IPS may include Snort software among other types of IPS. In step 510, if the actual or potential threat is detected, method 500B proceeds to step 530. Otherwise, method 500B proceeds to step 512.

In step 512, the cloud-based multi-function firewall determines whether the network traffic includes a data file. In some embodiments, the data file can include an image, an executable file, a PDF document, an audio file, a video file, and the like. For example, the data file may be an attachment if the network traffic includes an email to be sent to an email server in the insecure network. As another example, the data file may be a file download from a data source in the insecure network and intended for the user device. If the data file is detected, method 500B proceeds to step 514. Otherwise, method 500B proceeds to step 518.

In step 514, the cloud-based multi-function firewall routes the network traffic to a data file analyzer for processing. For example, as shown in method 500B, the network traffic may be routed from the IPS described in step 508 to the data file analyzer. As discussed above, however, other routing sequences may be possible. The data file analyzer can be configured to scan the data file to determine whether an actual or potential threat exists. In some embodiments, the data file analyzer compares the data file against a plurality of signatures known to be associated with threats (e.g., malware, keyloggers, botnets, etc.) to determine whether the network traffic is associated with a known threat. In some embodiments, the data file analyzer implements heuristic-based detection or behavior-based detection to determine whether the data file is associated with a potential threat. In some embodiments, the data file analyzer can implement sandbox-based detection by executing (e.g., opening) the data file in a contained environment to determine whether the data file is associated with an actual or potential threat. For example, the data file analyzer may transmit the data file to a sandbox server or a virtual machine implementing a sandbox to examine the effects that executing the data file has on the functionality of the sandbox server or the virtual machine. In some embodiments, the data file analyzer may include SquidClaimAV or Cuckoo. In step 516, if the actual or potential threat is detected, method 500B proceeds to step 530. Otherwise, method 500B proceeds to step 518.

In step 518, the cloud-based multi-function firewall routes the network traffic to network protocol filter for processing. In some embodiments, the network protocol filter analyzes one or more network protocols detected in the network traffic to determine whether an actual or potential threat exists. In some embodiments, the one or more protocols can be associated with one or layers in the Open Systems Interconnection model (OSI model). In some embodiments, the network protocol filter can be configured to analyze the network traffic (e.g., including one or more packets) with respect to a detected protocol by performing packet filtering, application recognition, packet payload filtering, protocol anomaly detection, and signature matching to determine whether an actual or potential threat exists in the network traffic. In step 520, if an actual or potential threat is detected, method 500B proceeds to step 530. Otherwise, method 500B proceeds to step 522.

In step 522, the cloud-based multi-function firewall determines that the network traffic is allowable. Accordingly, the cloud-based multi-function firewall may route the data traffic outside the cloud server to the insecure network or to the user device. For example, as described with respect to FIG. 3A, a network request, an example of network traffic, may be issued to the insecure network. As another example, as described with respect to FIG. 4, data traffic, an example of network traffic, from a data source in the insecure network may be allowed to be routed and transmitted to the user device.

In some embodiments, the network traffic originates from a first device associated with a private VN and is intended for a second device associated with the private VN. In these embodiments, the network traffic can be routed through the private VN maintained in the secure cloud, as discussed above.

In step 530, the cloud-based multi-function firewall generates an alert based on an actual or potential threat detected by a security module. In some embodiments, the alert includes one or more indicators that specify whether a potential threat was detected or whether an actual, known threat was detected. For, the one or more indicators may include a threat indicator indicating that a known threat is detected or an anomaly indicator indicating that a potential threat is detected. For example, the anomaly indicator may be included should a security module (e.g., the DNS analyzer, the IPS, the data file analyzer, or the network protocol filter) determine that the network traffic includes suspicious or anomalous information. In some embodiments, the alert includes information identifying the security module that detected the threat and one or more attributes included in the network traffic that caused the security module to trigger generation of the alert.

In step 532, the cloud-based multi-function firewall processes the network traffic based on the alert generated in step 530. In some embodiment, the cloud-based multi-function firewall can be configured to block the network traffic from being routed between the insecure network and the user device if the alert includes a threat indicator indicating that a known threat was detected. In some embodiments, the cloud-based multi-function firewall can be configured to allow the network traffic to be routed between the insecure network and the user device if the alert excludes the threat indicator and instead includes an anomaly indicator. In some embodiments, the anomaly indicator may be associated with a likelihood of being an actual threat (e.g., a probability). In these embodiments, the cloud-based multi-function firewall may compare the likelihood with a predetermined threshold and allow the network traffic to be routed if the likelihood falls below the predetermined threshold. If the likelihood exceeds or equals the predetermined threshold, the cloud-based multi-function firewall may block the network traffic from being routed.

In step 534, the cloud-based multi-function firewall transmits the alert to a policy engine (e.g., policy engine 132) to process the alert.

Figure 6:
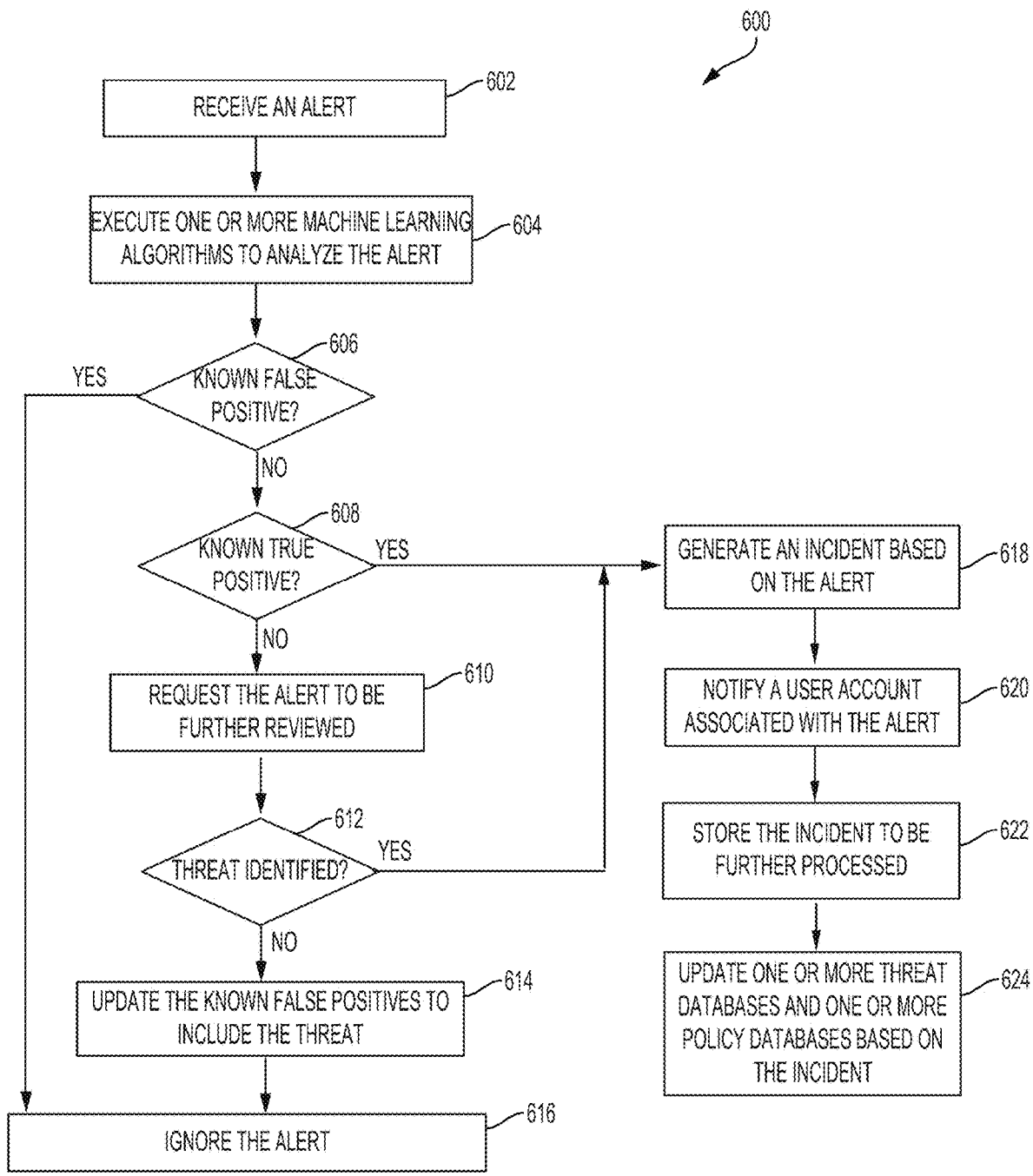
FIG. 6 illustrates a method for processing alerts generated in a secure cloud, according to some embodiments.

FIG. 6 illustrates a method 600 for processing alerts generated in a secure cloud, according to some embodiments. In some embodiments, a plurality of alerts may be generated by cloud-based multi-function firewalls 114A-D and 154A-B of cloud servers 112A-D and VPN nodes 150A-B, respectively, as described above with respect to FIG. 1. In some embodiments, an alert may be generated by a cloud-based multi-function firewall as described with respect to method 500B of FIG. 5B.

In step 602, an API server receives an alert generated by a cloud-based multi-function firewall of a cloud server or a VPN node in the secure cloud. In some embodiments, a policy engine (e.g., policy engine 132) in the API server receives the alert for further processing. For example, the alert may be received from a cloud-based multi-function firewall as described with respect to step 534 of FIG. 5B. In some embodiments, the alert includes a plurality of attributes including, without limitation, one or more of a type of threat, a specific pattern, a timestamp, a geo location, a hash value generated from network traffic, a policy rule match, a data file, a data size, an IP address, a domain name, a security module generating the alert, an IP address of a user device associated with the alert, or a combination thereof. In some embodiments, the plurality of attributes includes one or more indicators that specify whether a potential threat was detected or whether an actual, known threat was detected, as described with respect to FIG. 5B.

In step 604, the policy engine executes one or more machine learning algorithms to analyze the alert. In some embodiments, the policy engine inputs the plurality of attributes to the one or more machine learning algorithm to determine whether the actual or potential threat indicated in the alert is associated with a known false positive, a known true positive, or neither.

In step 606, if the policy engine determines that the alert is associated with a known false positive, method proceeds to step 616. Otherwise, method 600 proceeds to step 608.

In step 608, if the policy engine determines that the alert is associated with a known true positive, method proceeds to step 618. Otherwise, method 600 proceeds to step 610.

In step 618, the policy engine generates an incident based on the alert once the alert is verified to be associated with a true threat. In some embodiments, the incident represents an alert that indicates a threat that is verified to be an actual threat. In step 620, the policy engine notifies a user account associated with the alert that the threat specified in the alert is verified. In some embodiments, the policy engine can notify the user device associated with generating the alert. In some embodiment, a user of a user device (e.g., user device 102A) can access a user interface (e.g., user interface 146) in a security client to access the notifications of step 620. In step 622, the policy engine stores the incident to be further processed. In some embodiments, statistics for a plurality of stored incidents can be generated and displayed to a user via a user interface (e.g., user interface 146) or via a website to be accessed by users.

In step 624, the policy engine updates one or more threat databases (e.g., threat database 137) and one or more policy databases (e.g., policy database 133) based on the incident. In some embodiment, the policy engine updates the one or more threat databases to include the verified threat identified in the alert. In some embodiments, the policy engine updates global policy (e.g., global policy 134) in the one or more policy databases to include a rule that associates one or more attributes (in the alert) with the verified threat identified in the alert or that associates an action with the one or more attributes. For example, the action may be to a "block" action or a "flag" action.

In step 610, the policy engine requests the alert to be further reviewed. In some embodiments, the policy engine transmits the policy engine to one or more machine learning algorithms different from those in step 604 to determine whether a threat exists. In some embodiments, these machine learning algorithms can require greater processing time than those described with respect to step 604. In some embodiments, the policy engine transmits the alert to one or more analysts to be further reviewed. In some embodiments, analysts can be security experts that may have expertise in particular types of threats. Accordingly, the policy engine may match the alert associated with a type of threat to an analysts having expertise in that type of threat. In step 612, if the alert is determined to include a verified threat, method 600 proceeds to step 618. Otherwise, method 600 proceeds to step 614. In some embodiments, once the threat in the alert is verified, the policy engine can update the known true positives to include the threat identified in the alert.

In step 614, the policy engine updates the known false positives to include the threat associated with the alert. In some embodiments, the policy engine inputs the plurality of attributes associated with the alert and an input indicating the alert is not associated with a threat into the one or more machine learning algorithm described with respect to steps 604 or 610. By doing so, the one or more machine learning algorithm of steps 604 or 610 can be continuously trained to increase accuracy the more alerts that are processed, according to some embodiments. In some embodiments, the policy engine can update the global policy to include a rule indicating that the one or more attributes (in the alert) does not indicate a true threat.

In step 616, the policy engine ignores the alert because the alert is determined to not be associated with a true threat.

Figure 7:
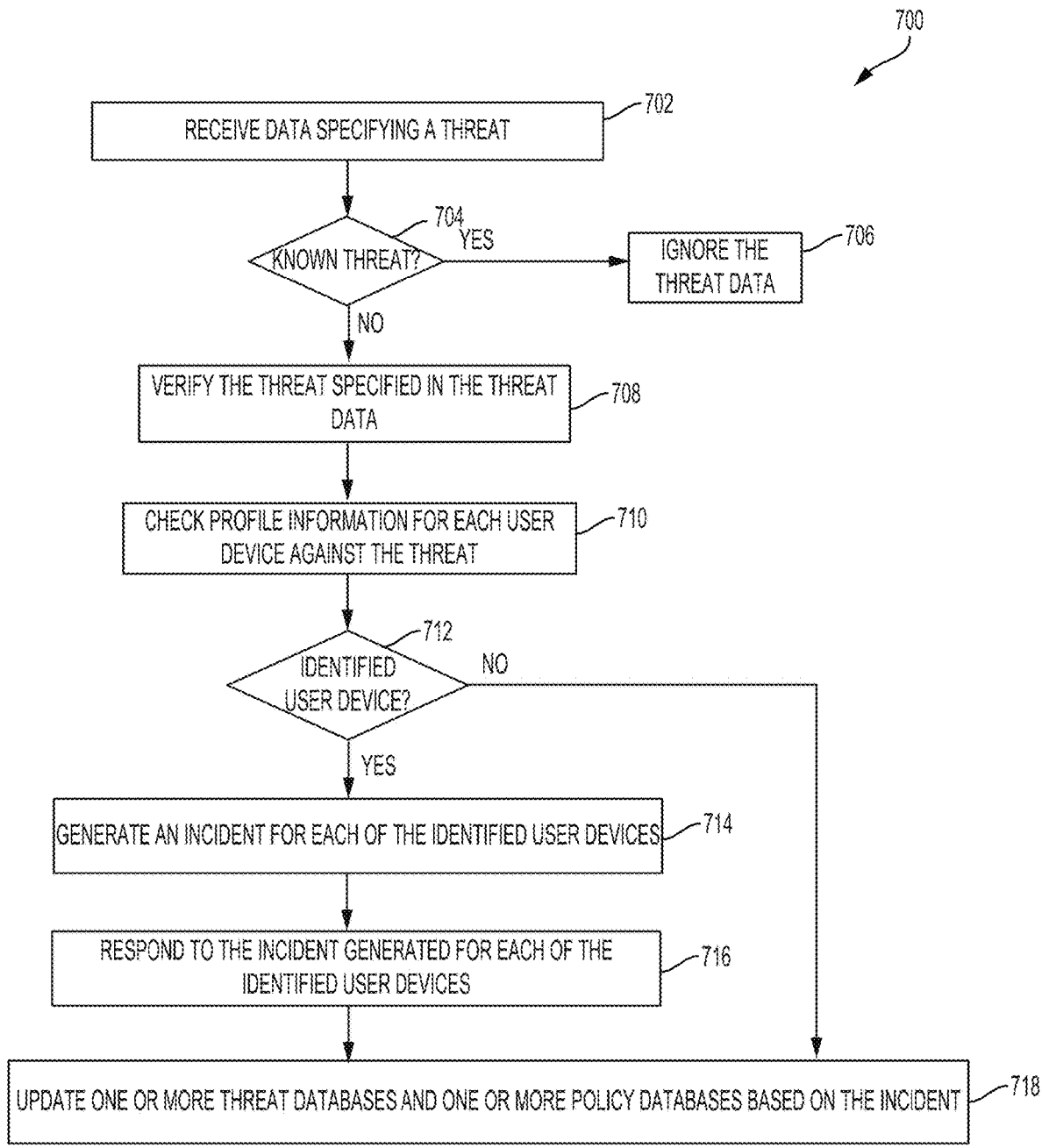
FIG. 7 illustrates a method for processing data specifying a threat, according to some embodiments.

FIG. 7 illustrates a method 700 for processing data specifying a threat database, according to some embodiments. In some embodiments, an API server (e.g., API server 130), can perform the processing. In some embodiments, a policy engine (e.g., policy engine 132) implemented on the API server can perform the processing.

In step 702, the policy engine receives data specifying a threat, herein referred to as threat data. In some embodiments, the threat data can be generated from a threat scraper from a plurality of threat scrapers. In some embodiments, a threat scraper can be a software module that scrapes shared intelligence from the Surface Web or extracted intelligence from the Deep Web or the Dark Web to identify threats. In some embodiments, the plurality of threat scrapers can run in parallel to identify threats. In some embodiments, like the alert described with respect to FIG. 6, the threat data can include a plurality of attributes including, without limitation, one or more of a type of threat, a specific pattern, a timestamp, a data file, a data size, an IP address, a domain name, a security module generating the alert, one or more file hashes, one or more execution patterns, or a combination thereof.

In step 704, the policy engine determines whether the threat is a known threat. In some embodiments, the policy engine can be configured to query one or more threat databases to determine whether the threat is already stored. In some embodiments, the policy engine queries global policy (e.g., global policy 134) stored across one or more tables of one or more policy databases to determine whether the rules for responding to the threat in the received data should be updated. If these rules need to be updated, the policy engine can update these rules and propagate updates to the one or more policy databases to a plurality of cloud servers in the secure cloud. If the threat is determined to be a known threat, method 700 proceeds to step 706. Otherwise method 700 proceeds to step 708. In step 706, the policy engine ignores the threat data.

In step 708, the policy engine verifies the threat specified in the threat data. In some embodiments, the policy engine can perform one or more steps, e.g., steps 604-614, of method 600 to determine whether the threat can be verified.

In step 710, the policy engine checks profile information (e.g., profile information 135) for each user device against the threat. In some embodiments, to check whether a first user device associated with first profile information was previously exposed to the threat, the policy engine may match one or more of the attributes in the threat data with data in the profile information for the first device. In some embodiments, the policy engine can determine that the first device was previously impacted by the threat if at least a predetermined number of attributes match, or a weighted sum of a number of attribute matches exceeds a predetermined threshold, or a combination thereof.

In step 712, based on the check in step 710, the policy engine determines whether one or more user devices are identified to have been previously impacted by the threat specified in the threat data. If the threat intelligence engine identifies one or more impacted user devices, method 700 proceeds to step 714. Otherwise, method 700 proceeds to step 718.

In step 714, the policy engine generates an incident for each of the one or more identified user devices. In some embodiments, the policy engine tracks a number of incidents for each user device connected to the secure cloud to generate statistics related to a number of identified threats.

In step 716, the policy engine responds to incident generated for each of the identified user devices. In some embodiments, to respond to a first incident generated for a first user device connective via a VPN connection to a first cloud server, the policy engine can issue one or more commands to the first user device. For example, the policy engine may transmit the one or more commands to the first cloud server. Then, the first cloud server may transmit the one more commands to the first user device via the VPN connection. As discussed above with respect to FIG. 1, a mitigation component on the user device may receive and execute the one or more commands to respond to identified threats.

In step 718, like in step 624, the policy engine updates one or more threat databases and one or more policy databases based on the threat data received in step 702. In some embodiments, the policy engine generates a plurality of configuration files based on the threat data to update the one or more threat databases. In some embodiments, the policy engine generates the plurality of configuration files to update a global policy (e.g., global policy 134) stored in one or more tables of the one or more policy databases.

Figure 8:
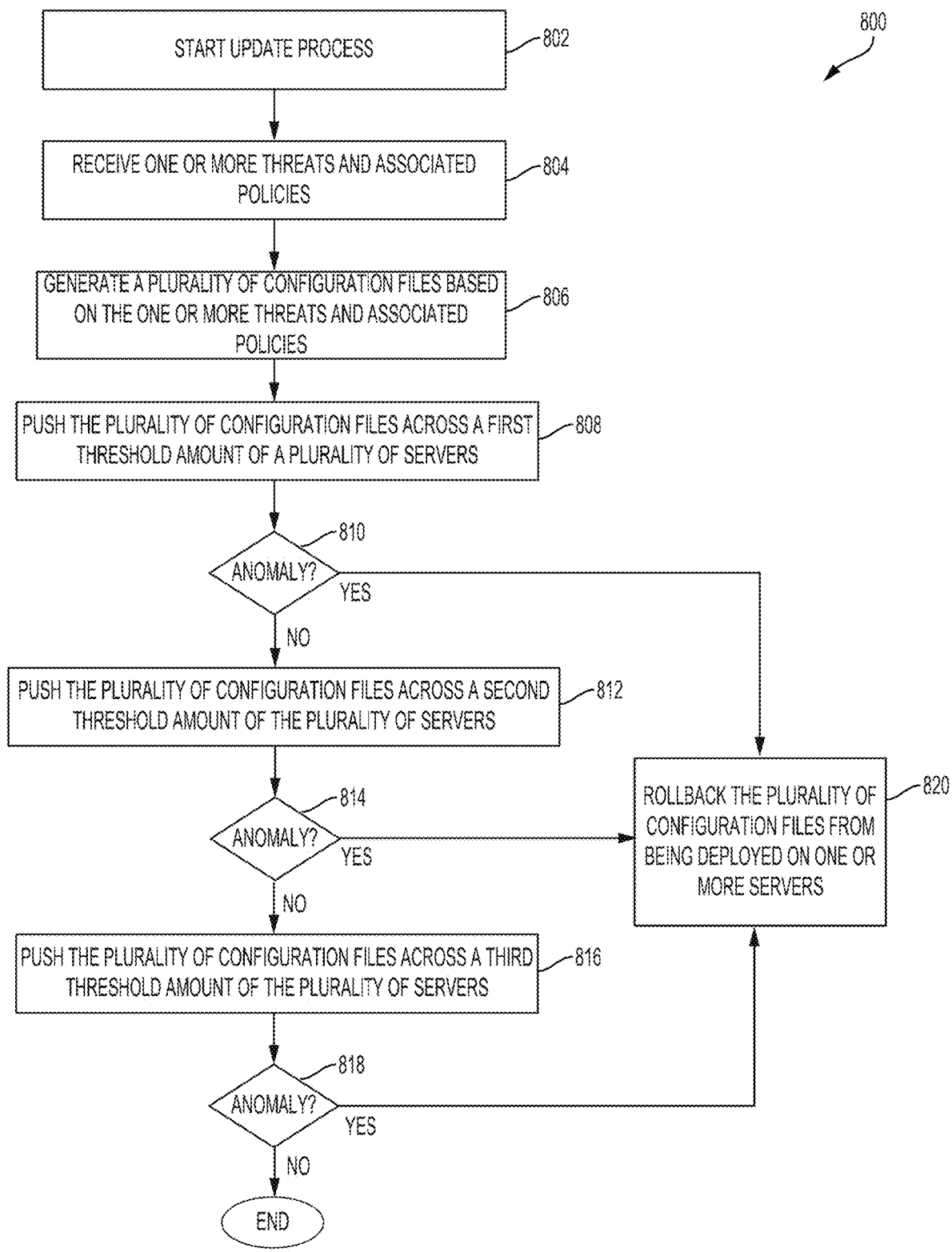
FIG. 8 illustrates a method for updating a plurality of servers in a secure cloud, according to some embodiments.

FIG. 8 illustrates a method 800 for updating a plurality of servers (e.g., cloud servers 112A-D or VPN nodes 150A-B) in a secure cloud, according to some embodiments. In some embodiments, the plurality of servers and the secure cloud may correspond to cloud servers 112A-D and VPN nodes 150A-B, and secure cloud 110, respectively, as described with respect to FIG. 1. In some embodiments, a deployment system including one or more deployment servers (e.g., deployment server 116) performs the updating.

In step 802, the deployment system starts an update process. In some embodiments, the deployment system may be run periodically, on demand, or a number of threat updates to one or more threat databases exceeds a predetermined threshold amount. For example, the deployment system can be configured to run upon receiving a deployment request from an API server (e.g., API server 130). In some embodiment, the deployment system may run for every incident that is generated by the policy engine as described with respect to FIGS. 6 and 7. In some embodiments, the policy engine queries the one or more threat databases to determine one or more newly added threats that have not been propagated to the plurality of servers in the secure network.

In step 804, the deployment system receives one or more threats and associated policies to be propagated to the plurality of servers in the secure cloud. In some embodiments, the deployment system can be configured to query one or more threat databases or one or more policy databases managed by the API server to determine one or more newly identified threats or newly added policies (e.g., rules) associated with threats since the deployment system last ran. In some embodiments, in response to the query, the deployment system may receive the one or more threats and associated policies (e.g., rules in global policy 134). In some embodiments where the deployment system runs for every identified threat, the deployment system retrieves the single, newly-identified threat.

In step 806, the deployment system generates a plurality of configuration files based on one or more threats and associates policies. In some embodiments, the plurality of configuration files include one or more configurations for each security module as described with respect to FIG. 5B. The plurality of configuration files can be used by a cloud-based multi-function firewall implemented at a server in the secure cloud to update a local copy of the one or more threat database at the API server to stay current on the latest identified threats. In some embodiments, the plurality of configuration files can be executed by the server to update a local copy of global policy (e.g., global policy 134) and a local copy of threats (e.g., threat database 137) for storage at the server.

In step 808, the deployment system pushes the plurality of configuration files across a first threshold amount of a plurality of servers in the secure cloud. For example, the first threshold amount may represent 25% of the plurality of servers. In some embodiments, the deployment system randomly selects the first threshold amount of servers. In step 810, the deployment system determines whether any anomaly is detected. If any anomaly is detected, method 800 proceeds to step 820. Otherwise, method 800 proceeds to step 812. In some embodiments, an anomaly may include an error generated by at least one server part of the first threshold amount, rapid increases in blocks, connection drops, high resource usage across the cloud, performance change in processing requests, network delays, high network bandwidth use, user connection drops, etc.

In step 812, the deployment system pushes the plurality of configuration files across a second threshold amount of a plurality of servers in the secure cloud. In some embodiments, the second threshold amount exceeds the first threshold amount. For example, the second threshold amount may represent 50% of the plurality of servers. In some embodiments, the second threshold amount of servers includes the servers selected to be part of the first threshold amount. In step 814, the deployment system determines whether any anomaly is detected. If any anomaly is detected, method 800 proceeds to step 820. Otherwise, method 800 proceeds to step 816.

In step 816, the deployment system pushes the plurality of configuration files across a third threshold amount of a plurality of servers in the secure cloud. In some embodiments, the third threshold amount exceeds the second threshold amount. For example, the third threshold amount may represent 100% of the plurality of servers. In some embodiments, the third threshold amount of servers includes the servers selected to be part of the second threshold amount. In step 818, the deployment system determines whether any anomaly is detected. If any anomaly is detected, method 800 proceeds to step 820. Otherwise, method 800 ends.

In step 820, the deployment system rolls back the plurality of configuration files being deployed by one or more cloud servers in the server.

Figure 9:
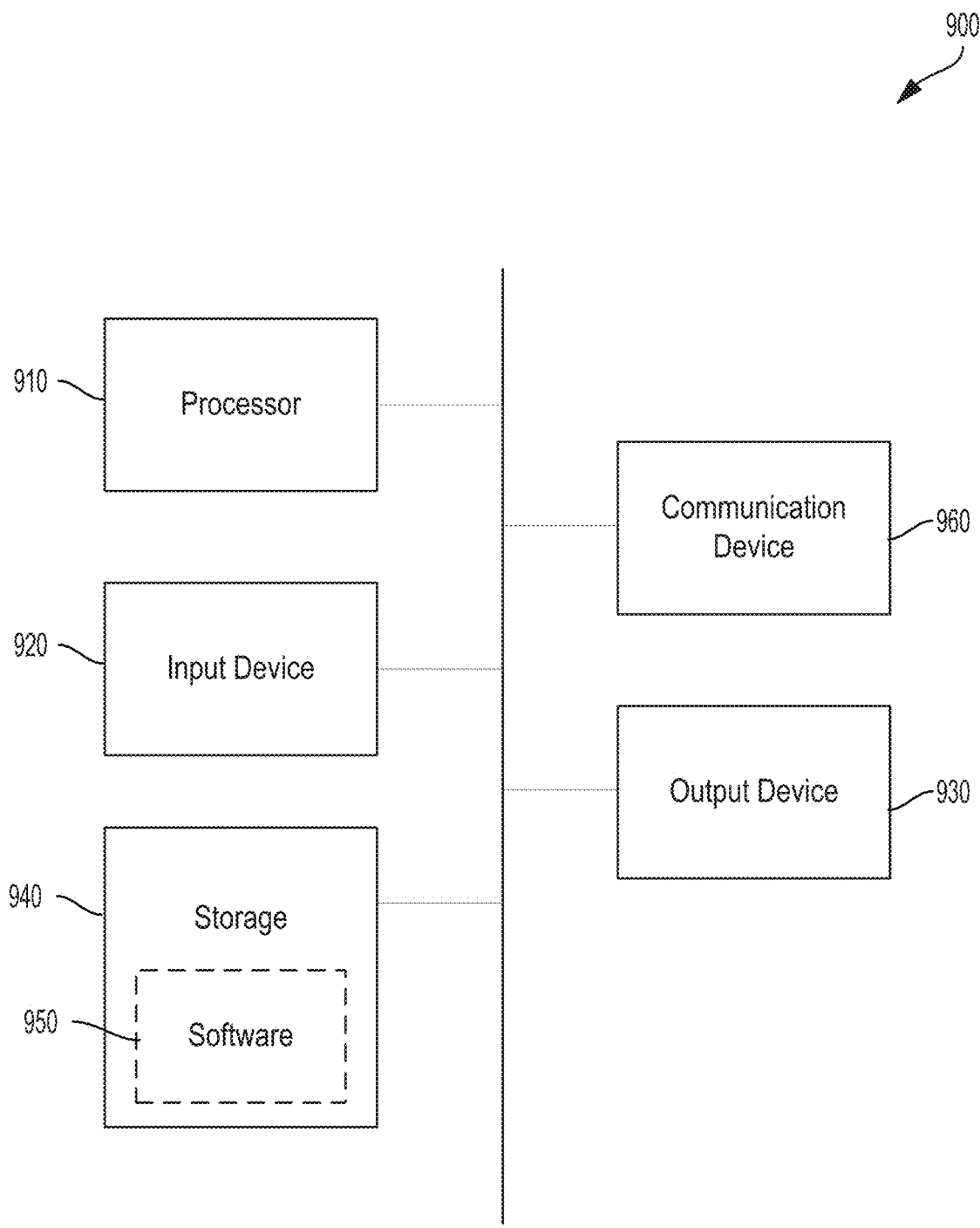
FIG. 9 illustrates an example of a computer, in accordance with one embodiment.

FIG. 9 illustrates an example of a computer in accordance with one embodiment. Computer 900 can be a component of a system for providing a cloud firewall according to the systems and methods described above, such as one of cloud servers 112AA-D, VPN nodes 150A-B, or user devices 102A-B and 107 as described with respect to FIG. 1. In some embodiments, computer 900 is configured to execute a method for providing or updating a cloud-based multi-function firewall, such as each of methods 200, 300A-B, 400, 500B, 600, 700, and 800 of FIGS. 2, 3A-B, 4, 5B, 6, 7, and 8, respectively.

Computer 900 can be a host computer connected to a network. Computer 900 can be a client computer or a server. As shown in FIG. 9, computer 900 can be any suitable type of microprocessor-based device, such as a personal computer, workstation, server, videogame console, or handheld computing device, such as a phone or tablet. The computer can include, for example, one or more of processor 910, input device 920, output device 930, storage 940, and communication device 960. Input device 920 and output device 930 can generally correspond to those described above and can either be connectable or integrated with the computer.

Input device 920 can be any suitable device that provides input, such as a touch screen or monitor, keyboard, mouse, or voice-recognition device. Output device 930 can be any suitable device that provides output, such as a touch screen, monitor, printer, disk drive, or speaker.

Storage 940 can be any suitable device that provides storage, such as an electrical, magnetic, or optical memory, including a RAM, cache, hard drive, CD-ROM drive, tape drive, or removable storage disk. Communication device 960 can include any suitable device capable of transmitting and receiving signals over a network, such as a network interface chip or card. The components of the computer can be connected in any suitable manner, such as via a physical bus or wirelessly. Storage 940 can be a non-transitory computer-readable storage medium comprising one or more programs, which, when executed by one or more processors, such as processor 910, cause the one or more processors to execute methods described herein, such as each of methods 200, 300A-B, 400, 500B, 600, 700, and 800 of FIGS. 2, 3A-B, 4, 5B, 6, 7, and 8, respectively.

Software 950, which can be stored in storage 940 and executed by processor 910, can include, for example, the programming that embodies the functionality of the present disclosure (e.g., as embodied in the systems, computers, servers, and/or devices as described above). In some embodiments, software 950 can be implemented and executed on a combination of servers such as application servers and database servers.

Software 950, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 940, that can contain or store programming for use by or in connection with an instruction execution system, apparatus, or device.

Software 950 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 900 can implement any operating system suitable for operating on the network. Software 950 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description sets forth exemplary methods, parameters and the like. It should be recognized, however, that such description is not intended as a limitation on the scope of the present disclosure but is instead provided as a description of exemplary embodiments. The illustrative embodiments described above are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description uses terms first, second, etc. to describe various elements, these elements should not be limited by the terms. These terms are only used to distinguish one element from another.

In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer readable storage medium stores one or more programs configured to be executed by one or more processors of a computing device, the one or more programs including instructions for implementing any of the steps described or claimed herein. The present disclosure also relates to a device for performing the operations herein. This device may be specially constructed for the required purposes, or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description above. In addition, the present disclosure is not described with reference to any particular programming language. It will be appreciated that a variety of programming languages may be used to implement the teachings of the present disclosure as described herein.

What is claimed is:

1. A method for providing a cloud-based multi-function firewall, comprising:
    blocking, by a network-enabled device with a security appliance client, one or more network connections provided by the network-enabled device, wherein the one or more network connections include network connections to an external network and to an internal network;
    retrieving device information associated with the network-enabled device associated with a user;
    transmitting the user information and the device information from the network-enabled device to an application program interface (API) server in a secure cloud to configure a virtual private network (VPN) connection between the secure cloud and the network-enabled device, wherein the user information includes a user configurable selection policy and the device information includes location information of the network-enabled device;
    permitting, by the API server, the network-enabled device to access a plurality of cloud servers in one or more locations, wherein the plurality of cloud servers are configured to route network traffic among the plurality of cloud servers within the secure cloud;
    selecting, by the API server, a cloud server from the plurality of cloud servers in the secure cloud, wherein the selection is based on the user configurable selection policy, the location information of the network-enabled device, and location information of the plurality of cloud servers;
    receiving cloud information from the API server, the cloud information specifying the selected cloud server in the secure cloud;
    updating domain name service (DNS) and routing functions at the network-enabled device to forward network requests to the selected cloud server specified in the cloud information; and
    establishing the VPN connection to the secure cloud for network services based on the cloud information, wherein network traffic to and from the network-enabled device is routed through the VPN connection to the cloud-based multi-function firewall implemented on the selected cloud server.

2. The method of claim 1, wherein the cloud information comprises a first domain name or a first Internet Protocol (IP) address of the cloud server.

3. The method of claim 2, wherein establishing the VPN comprises:
    establishing the VPN connection based on the first domain name or the first IP address.

4. The method of claim 1, comprising:
    receiving a network request generated at the network-enabled device, wherein the network request comprises a second domain name or a second IP address; and
    transmitting the network request, via the VPN connection, to the cloud-based multi-function firewall implemented at the cloud server.

5. The method of claim 4, wherein the cloud-based multi-function firewall is configured to determine whether the network request is associated with a threat and whether the network request is allowed based on a security policy.

6. The method of claim 5, wherein the cloud-based multi-based function firewall is configured to block the network request from being transmitted in response to determining that the network request is associated with the threat or disallowed based on the security policy.

7. The method of claim 6, comprising:
    receiving a notification from the cloud server, the notification indicating that the network request is blocked by the cloud-based multi-function firewall.

8. The method of claim 1, comprising:
    monitoring a device status and a network status, the device status and the network status each associated with the network-enabled device;

determining that the device status or the network status being monitored indicates that the network-enabled device regains a network connectivity; and when the network-enabled device regains the network connectivity, reestablishing the VPN connection.

9. The method of claim 1, wherein the selection of the cloud server is further based on one or more of: an IP address of the cloud server, a network bandwidth, or a processing load of the cloud server, or an exponential backoff time of the cloud server.

10. The method of claim 1, wherein the device information comprises one or more of an IP address associated with the network-enabled device, a MAC address associated with the network-enabled device, or a unique identifier associated with the network-enabled device.

11. The method of claim 1, wherein the network-enabled device comprises a user device or an edge device.

12. The method of claim 1, wherein the network traffic comprises a network request between the network-enabled device and another device on an external network with respect to the network-enabled device.

13. The method of claim 1, wherein the network traffic comprises a network request between the network-enabled device and another network-enabled device on a same internal network.

14. The method of claim 1, wherein the secure cloud is configured to configure a private virtual network (VN) within the secure cloud to correspond to an internal network associated with the network-enabled device.

15. The method of claim 14, wherein the cloud server is configured to configure a virtual interface to enable the network-device to access the private VN via the VPN connection.

16. The method of claim 15, wherein the cloud server is configured to configure the virtual interface based on the user information or the device information.

17. The method of claim 14, wherein network traffic intended for the internal network is configured to be routed through the private VN.

18. A method for providing a cloud-based multi-function firewall, comprising:
blocking, by a network-enabled device with a security appliance client, one or more network connections provided by the network-enabled device, wherein the one or more network connections include network connections to an external network and to an internal network;
receiving, from the network-enabled device, device information associated with the network-enabled device and user information associated with the user of the network-enabled device, wherein the device information includes location information of the network-enabled device and the user information includes a user configurable selection policy;
permitting, by an application program interface (API) server, the network-enabled device to access a plurality of cloud servers within a secure cloud, wherein the plurality of cloud servers are configured to route network traffic among the plurality of cloud servers located in one or more locations;
selecting, by the API server, a first cloud server from the plurality of cloud servers in the secure cloud based on the user configurable selection policy, the location information of the network-enabled device, and location information of the plurality of cloud servers;
transmitting cloud information from the first cloud server to the network-enabled device, the cloud information identifying the first cloud server; and
enabling the network-enabled device to establish a virtual private network (VPN) connection to the first cloud server for network services, wherein network traffic to and from the network-enabled device is routed through the VPN connection to the cloud-based multi-function firewall implemented on the first cloud server.

19. The method of claim 18, wherein the cloud information comprises a domain name or an Internet Protocol (IP) address of the first cloud server.

20. The method of claim 19, wherein the VPN connection is established based on the domain name or the IP address of the first cloud server.

21. The method of claim 18, comprising:
receiving, via the VPN connection, a network request from the network-enabled device, the network request being generated at the network-enabled device, wherein the network request comprises a requested domain name or a requested IP address; and
analyzing, via the cloud-based multi-function firewall, the network request to determine whether a threat exists and whether the network request is allowed based on a security policy.

22. The method of claim 21, comprising:
upon determining that the threat exists or that the network request is disallowed by the security policy, blocking the network request; and
transmitting a notification to the network-enabled device, the notification indicating that the network request is blocked and associated with the threat.

23. The method of claim 21, comprising:
receiving a first IP address from the network-enabled device;
upon determining that the threat does not exist and that the network request is allowed, retrieving a second IP address associated with the first IP address; and
generating a second network request to include the second IP address instead of the first IP address; and
transmitting the second network request.

24. The method of claim 18, comprising:
receiving attributes of one or more cloud server from the plurality of cloud servers; and
selecting the first cloud server based on the attributes.

25. The method of claim 24, wherein the attributes of the first cloud server include one or more of: an IP address of the secure cloud, a physical location of the first cloud server, a network bandwidth at the first cloud server, or a processing load of the first cloud server.

26. The method of claim 18, comprising:
receiving a first IP address from the network-enabled device;
receiving network data from an insecure network, wherein the network data includes a second IP address associated with the first IP address; and
analyzing, via the cloud-based multi-function firewall, the network data to determine whether a threat exists and whether the network data is allowed based on a security policy.

27. The method of claim 26, comprising:
upon determining that the threat exists or that the network data is disallowed, blocking the network data; and
transmitting a notification to the network-enabled device, the notification indicating that the network data is blocked and associated with the threat.

28. The method of claim 26, comprising:
upon determining that the threat does not exist and that the network data is allowed, determining that the second IP address is associated with the first IP address; and
transmitting the network data to the network-enabled device through the VPN connection associated with the first IP address.

29. The method of claim 18, wherein the network-enabled device comprises a user device or an edge device.

30. The method of claim 18, wherein the network traffic comprises a network request between the network-enabled device and another device on an external network with respect to the network-enabled device.

31. The method of claim 18, wherein the network traffic comprises a network request between the network-enabled device and another network-enabled device on a same internal network.

32. The method of claim 18, wherein the secure cloud is configured to configure a private virtual network (VN) within the secure cloud to correspond to an internal network associated with the network-enabled device.

33. The method of claim 32, wherein the cloud server is configured to configure a virtual interface to enable the network-device to access the private VN via the VPN connection.

34. The method of claim 33, wherein the cloud server is configured to configure the virtual interface based on the user information or the device information.

35. The method of claim 32, wherein network traffic intended for the internal network is configured to be routed through the private VN.

36. A system for providing a cloud-based multi-function firewall, the system comprising one or more processors, memory, and one or more programs stored in the memory and configured to be executed by the one or more processors, the one or more programs including instructions for:
blocking, by a network-enabled device with a security appliance client, one or more network connections provided by the network-enabled device, wherein the one or more network connections include network connections to an external network and to an internal network;
retrieving device information associated with the network-enabled device associated with a user;
transmitting the user information and the device information from the network-enabled device to an application program interface (API) server in a secure cloud to configure a virtual private network (VPN) connection between the secure cloud and the network-enabled device, wherein the user information includes a user configurable selection policy and the device information includes location information of the network-enabled device;
permitting, by the API server, the network-enabled device to access a plurality of cloud servers in one or more locations, wherein the plurality of cloud servers are configured to route network traffic among the plurality of cloud servers within the secure cloud;
selecting, by the API server, a cloud server from the plurality of cloud servers in the secure cloud, wherein the selection is based on the user configurable selection policy, the location information of the network-enabled device, and location information of the plurality of cloud servers;
receiving cloud information from the API server, the cloud information specifying the selected cloud server in the secure cloud;
updating domain name service (DNS) and routing functions at the network-enabled device to forward network requests to the selected cloud server specified in the cloud information; and
establishing the VPN connection to the secure cloud for network services based on the cloud information, wherein network traffic to and from the network-enabled device is routed through the VPN connection to the cloud-based multi-function firewall implemented on the selected cloud server.

37. A system for providing a cloud-based multi-function firewall, the system comprising a first cloud server in a secure cloud, wherein the first cloud server comprises one or more processors, memory, and one or more programs stored in the memory and configured to be executed by the one or more processors, the one or more programs including instructions for:
receiving, from a network-enabled device, device information associated with the network-enabled device and user information associated with a user of the network-enabled device, wherein the device information includes location information of the network-enabled device and the user information includes a user configurable selection policy;
selecting the first cloud server from a plurality of cloud servers in the secure cloud based on the user configurable selection policy, the location information of the network-enabled device, and location information of the plurality of cloud servers;
transmitting cloud information from the secure cloud to the network-enabled device, the cloud information identifying the first cloud server and being generated by an application program interface (API) server in the secure cloud; and
enabling the network-enabled device to establish a virtual private network (VPN) connection to the first cloud server for network services, wherein network traffic to and from the network-enabled device is routed through the VPN connection to the cloud-based multi-function firewall implemented on the first cloud server.

38. A non-transitory computer-readable storage medium comprising a security appliance client installed on a network-enabled device to provide a cloud-based multi-function firewall, wherein the security appliance client includes instructions that when executed by the network-enabled device having one or more processors cause the one or more processors to perform instructions comprising:
blocking, by the security appliance client, one or more network connections provided by the network-enabled device, wherein the one or more network connections include network connections to an external network and to an internal network;
retrieving device information associated with the network-enabled device associated with a user;
transmitting the user information and the device information from the network-enabled device to an application program interface (API) server in a secure cloud to configure a virtual private network (VPN) connection between the secure cloud and the network-enabled device, wherein the user information includes a user configurable selection policy and the device information includes location information of the network-enabled device;
permitting, by the API server, the network-enabled device to access a plurality of cloud servers in one or more locations, wherein the plurality of cloud servers are configured to route network traffic among the plurality of cloud servers within the secure cloud;

receiving cloud information from the secure cloud, the cloud information specifying a cloud server selected from the plurality of cloud servers in the secure cloud and being generated by the API server in the secure cloud based on the user configurable selection policy, the location information of the network-enabled device, and location information of the plurality of cloud servers;

updating domain name service (DNS) and routing functions at the network-enabled device to forward network requests to the cloud server specified in the cloud information; and establishing the VPN connection to the secure cloud for network services based on the cloud information, wherein network traffic to and from the network-enabled device is routed through the VPN connection to the cloud-based multi-function firewall implemented on the cloud server.

39. A non-transitory computer-readable storage medium comprising instructions for providing a cloud-based multi-function firewall, wherein the instructions, when executed by a first cloud server having one or more processors, cause the one or more processors to perform instructions comprising:

receiving, from a network-enabled device, device information associated with the network-enabled device and user information associated with a user of the network-enabled device, wherein the device information includes location information of the network-enabled device and the user information includes a user configurable selection policy;

selecting a first cloud server from a plurality of cloud servers in a secure cloud based on the user configurable selection policy, the location information of the network-enabled device, and location information of the plurality of cloud servers;

transmitting cloud information from the secure cloud to the network-enabled device, the cloud information identifying the first cloud server and being generated by an application program interface (API) server in the secure cloud; and enabling the network-enabled device to establish a virtual private network (VPN) connection to the first cloud server for network services, wherein network traffic to and from the network-enabled device is routed through the VPN connection to the cloud-based multi-function firewall implemented on the first cloud server.

\* \* \* \* \*